United States Patent
Curran et al.

[19]

[11] Patent Number: 6,011,507
[45] Date of Patent: *Jan. 4, 2000

[54] RADAR SYSTEM AND METHOD OF OPERATING SAME

[75] Inventors: Anthony Curran, Brookline; Steven L. Potts, Andover; Arthur Crain, Framingham, all of Mass.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,530

[22] Filed: Nov. 12, 1996

[51] Int. Cl.$^7$ .................................................. G01S 13/72
[52] U.S. Cl. ................................................................ 342/70
[58] Field of Search ................................. 342/70, 71, 72, 342/111, 108, 116, 129, 145, 196; 701/96, 301

[56] References Cited

U.S. PATENT DOCUMENTS

| | | | |
|---|---|---|---|
| 5,268,692 | 12/1993 | Grosch et al. | 342/70 |
| 5,325,097 | 6/1994 | Zhang et al. | 342/71 |
| 5,471,214 | 11/1995 | Faibish et al. | 342/70 |
| 5,563,602 | 10/1996 | Stove | 342/70 |
| 5,619,208 | 4/1997 | Tamatsu et al. | 342/70 |
| 5,625,362 | 4/1997 | Richardson | 342/70 |
| 5,633,642 | 5/1997 | Hoss et al. | 342/70 |
| 5,652,589 | 7/1997 | Ono et al. | 342/70 |

*Primary Examiner*—Daniel T. Pihulic
*Attorney, Agent, or Firm*—Daly, Crowley & Mofford, LLP

[57] ABSTRACT

A method of operating a radar system, including the steps of digitally sampling a received signal at a predetermined sampling rate, to periodically provide a set of selected samples, the set of selected samples including positive going ramp samples, negative going ramp samples and CW burst samples and performing a first fast Fourier transform (FFT) on the positive going ramp samples, performing a second fast Fourier transform on the negative going ramp samples and performing a third fast Fourier transform on the CW burst samples is described. Utilizing the subsequent radar operations the method further includes the steps of tracking each resulting signal from the first fast Fourier transform performing steps, tracking each resulting signal from the second fast Fourier transform performing steps and tracking each resulting signal from the third fast Fourier transform performing steps and associating any resulting signals from the tracking steps to periodically provide output signals indicative of other vehicles.

20 Claims, 18 Drawing Sheets

RADAR SYSTEM AND METHOD OF OPERATING SAME

BACKGROUND OF THE INVENTION

This invention relates to millimeter wave radars and more particularly to a frequency modulated continuous wave (FMCW) sequential lobing tracking radar for tracking vehicles on a roadway. Still more particularly the invention relates to radar information storage and processing as applied to an automobile radar.

Automobile movement occurs every day on the world's roadways. In long trips it is often desirable to use a feature of an automobile commonly referred to as cruise control wherein a predetermined speed of a vehicle is set by an operator and a cruise control system controls the vehicle to maintain the predetermined speed. Unfortunately, such a system requires the operator to manually override the cruise control system when conditions preclude the vehicle from traveling the predetermined speed.

With a radar system mounted in a vehicle, it would be possible to recognize an existence of other vehicles. Such a radar would need to be able to distinguish moving vehicles from one another as well as from other objects typically found along a roadway. With a radar system mounted in the vehicle, guidance control signals can be fed to a cruise control system to more efficiently control the speed of the vehicle.

In a typical FMCW radar the transmitted waveform includes a positive slope frequency ramp, a negative slope frequency ramp and an interval of constant frequency (CW burst). In a sequential lobing tracking system, the waveform is repeated for each antenna lobe in sequence. The radar return in each antenna lobe is processed by a positive going ramp FFT (Fast Fourier Transform), a negative going ramp FFT and a CW burst FFT, and combined in a composite tracker to provide a range, a range rate, an acceleration and an angle associated with the target.

SUMMARY OF THE INVENTION

With the foregoing background in mind, it is an object of this invention to provide an FMCW radar system for identifying and accurately tracking targets in a highly cluttered environment.

Another object of this invention is to provide a technique for properly decoupling range and range rate information from multiple targets along a congested roadway.

Still another object of this invention is to provide a technique for accurately resolving target information so as to predict when targets will become closely spaced.

Still another object of this invention is to provide a technique for accurately resolving target information so as to predict target locations.

Still another object of this invention is to provide a reliable track of the vehicles within radar range by comparing the predicted target locations with data from subsequent radar actions.

Still another object of this invention is to provide a sorting process that will identify the target vehicle being followed by the radar equipped vehicle from all other vehicles on the roadway (i.e., the primary target).

Still another object of this invention is to provide a report to the vehicle's cruise control on the status and/or changes to the primary target's location parameters.

Still another object of this invention is to provide a method of determining when the roadway ahead is curved and the primary target is no longer directly in front of the radar equipped vehicle. This makes it possible to tell the difference between a curve in the roadway and the primary target leaving the roadway (such as an exit ramp).

Still another object of this invention is to provide a search function should the track of the primary target become invalid (departure, intervening vehicle, etc.).

Still another object of this invention is to provide the above processes by means of observing and tracking the various targets in the frequency domain (as opposed to the spatial domain) in order to reduce the amount of data processing and storage involved, considering the large number of targets on a congested roadway.

The foregoing and other objects of this inventions are met generally by a method of operating a radar system, including the steps of digitally sampling a received signal at a predetermined sampling rate, to periodically provide a set of selected samples, the set of selected samples including positive going ramp samples, negative going ramp samples and CW burst samples and performing a first fast Fourier transform (FFT) on the positive going ramp samples, performing a second fast Fourier transform on the negative going ramp samples and performing a third fast Fourier transform on the CW burst samples. Utilizing the subsequent radar operations the method further includes the steps of tracking each resulting signal from the first fast Fourier transform performing steps, tracking each resulting signal from the second fast Fourier transform performing steps and tracking each resulting signal from the third fast Fourier transform performing steps and associating any resulting signals from the tracking steps to periodically provide output signals indicative of targets. With such an arrangement, a technique of operating a radar system is provided for properly decoupling range and range rate information from multiple targets along a congested roadway.

In accordance with another aspect of the present invention, the method includes repeating the sampling, performing and tracking steps for each antenna beam. With such an arrangement, angular spatial data may be obtained so as to enable a polar spatial plot of the target vehicles' parameters (locations and rates). Furthermore, a technique is provided for predicting when targets will become closely spaced in frequency so as to reduce interference within the system.

BRIEF DESCRIPTION OF THE DRAWINGS

For a more complete understanding of this invention, reference is now made to the following descriptions of the accompanying drawings, wherein.

DESCRIPTION OF THE PREFERRED EMBODIMENTS

Figure 1:
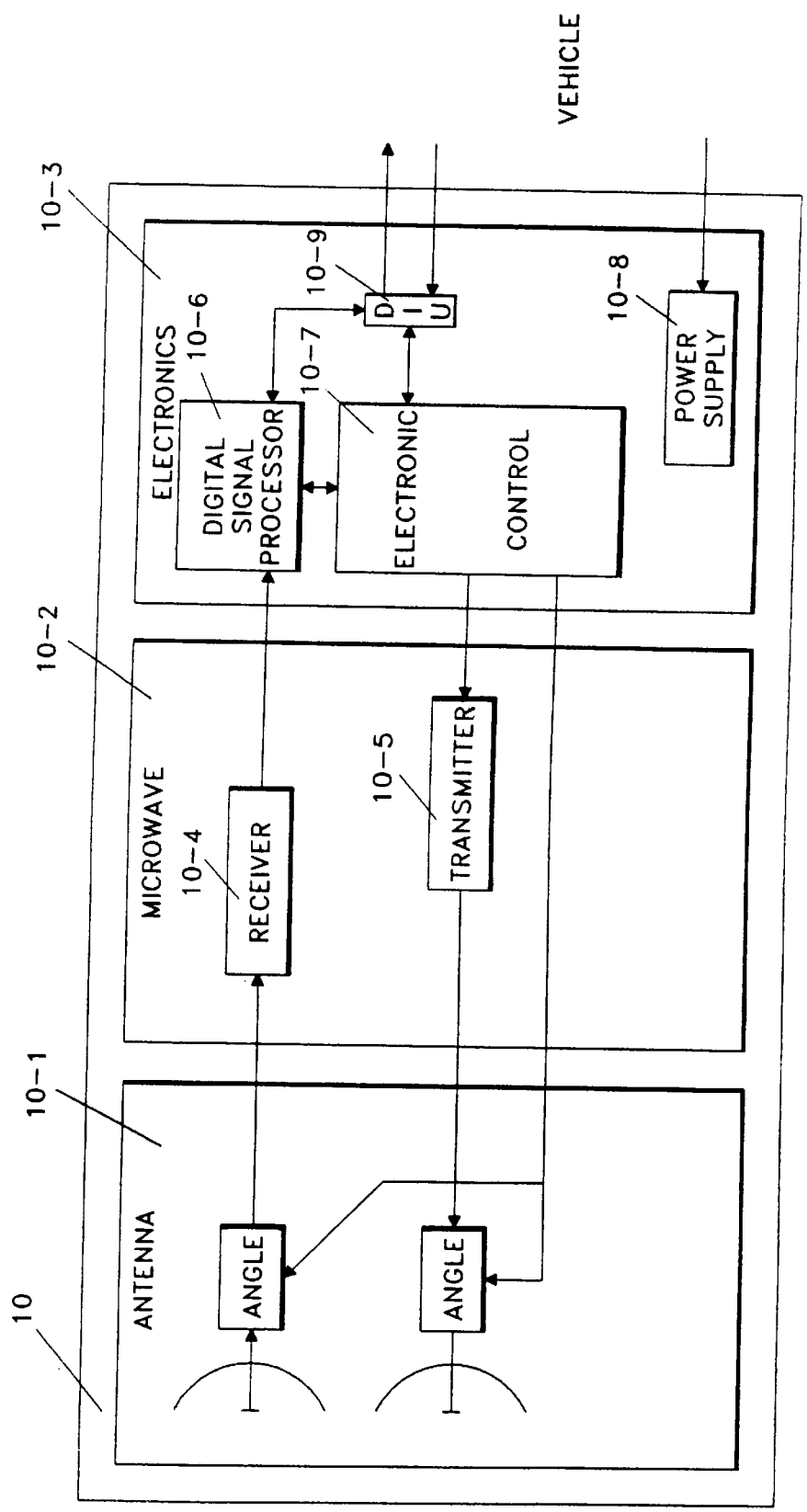
FIG. 1 is a block diagram of a simplified radar sensor according to the invention.

Before proceeding with a detailed description of the contemplated frequency modulated continuous wave (FMCW) radar system, a brief review of some of the contemplated techniques will be helpful for an understanding of the invention. FMCW systems sweep frequency as a function of time and determine target location and velocity by the frequency difference between the transmitted and received signals. Although various modulation waveforms can be used, the processing described herein uses a linear sweep versus time. During one total waveform period, the transmitted signal is increased in frequency for a time period (i.e. a positive ramp), then decreased in frequency for a time period (i.e. a negative ramp) and then maintained at a nonvarying frequency signal (i.e. CW burst). For a given relative range, $R_{rel}$ and relative range rate, $V_{rel}$ the observed frequency difference due to range, $f_{range}$, and range rate, $f_{rate}$, are:

$$f_{range} = C_1 R_{rel}$$

$$f_{range} = C_2 V_{rel}$$

respectively. The coefficients $C_1$ and $C_2$ are dependent on the waveform parameters. These frequency changes due to range and range rate result in a different measured frequency differences for the up and down ramps. For a typical complimentary ramp FMCW system (up and down slopes have equal magnitudes), the measured frequency differences for the positive and negative going ramps are:

$$f_{pos} = -f_{range} + f_{rate}$$

$$f_{neg} = +f_{range} + f_{rate}$$

respectively. In the event that only one target is present, the range and range rate can be unambiguously derived from the ramp frequencies and as follows:

$$R_{rel} = (f_{neg} - f_{pos})/2C_1$$

$$V_{rel} = (f_{neg} + f_{pos})/2C_2$$

If more than one target is present, additional processing is required to derive ranges and range rates from the ramp frequencies. For example, if there were ten targets in the beam, there would be ten frequencies from the positive going ramps and ten frequencies from the negative going ramps. There would therefore be one hundred possible combinations of positive and negative going ramp frequencies. Since there are only ten targets, there must be ninety false targets due to improper pairing of ramp frequencies for which ranges and range rates can be calculated. With no further processing, there is no method to identify the correct frequency pairing.

In the contemplated radar processor, a method of tracking targets in frequency space is used separately for the positive going ramp and the negative going ramps is used for each antenna beam. After proper target identification has been made, an association between the two ramps can be made without any ambiguity. Also, in cases where data from one ramp has an interfering target (wherein the ramp frequency for a target coincides with the ramp frequency of an interfering target having a different range rate, but the same measured frequency), the data from the other ramp can still be valid. Under these circumstances, a tracking update can be made, unlike in the typical FMCW system which requires data from both ramps to identify and update the target track during that sample. Since only the ten frequencies from each ramp are used, there are data from only ten targets to be stored in each ramp (a total of twenty targets in two ramps) as opposed to one hundred in the normal FMCW system. Furthermore, by separately tracking the targets in frequency for each ramp and thereby being able to predict when targets will become closely spaced in frequency, interference rejection can be enhanced.

Description of the Radar Sensor

Referring now to FIG. 1, a symbolic block diagram of a radar (10) required to supply the appropriate signals to the processor, there is an antenna assembly (10-1), a microwave assembly (10-2), having both transmitter (10-5) and receiver (10-4) functions, and an electronic assembly (10-3), consisting of the signal processor (10-6), power supplies (10-8), control (10-7) and the digital interface (10-9) with the automobile.

The radar action starts with the transmitter (10-5), including a microwave voltage controlled oscillator (VCO) (not shown), which generates the waveform described above, with the aid of noise degenerating and linearizing circuits. (The linearizing circuits start with an interferometer whose output signal is proportional to the slope of the ramp coming out of the VCO. This also degenerates the PM noise on the VCO. The CW burst has its frequency stabilized and its noise degenerated by being phase locked to a harmonic of the system clock.) The output of the VCO is divided, part to the receiver, where it is used to generate the first local oscillator signal (LO) for the receiver, and part to the antenna assembly for transmission.

The antenna assembly (10-1) includes two antennas, one for transmitting and one for receiving. Both are multi-lobed, being controlled in parallel so they both will point in the same direction. The circuitry in the angle selecting circuitry depends upon the design of the antennas being used. (For example, the antenna lobe to be used could be selected by a multi-position switch.)

The output from the receiving antenna goes to the microwave receiver, where one or more local oscillator signals are offset in frequency from the transmitted signal by a fixed amount. This is done so that there is no ambiguity in the frequency calculation, i.e., there will be no negative frequencies, only frequencies below the offset frequency. The output of the receiver is at the offset frequency, with the target frequencies either above or below it. The offset frequency is obviously larger than the greatest negative frequency expected from a target.

The receiver includes an attenuator controlled by the processor and it delivers its output to the processor (10-6). This includes an analog to digital converter (A/D), sampled at a rate at least twice the largest frequency out of the receiver. (In a model of the radar built to demonstrate its performance, the sampling rate was 1 MHz, with a maximum frequency from the receiver of 480 kHz.) These signals then go to the FFT to be analyzed into frequencies and magnitudes of the component signals in the complex received signal. The FFT outputs serve as data for the rest of the signal processor.

The remaining parts of the radar are standard items, power supplies (10-8), control circuits (10-7) that include a system clock (crystal controlled oscillator) for frequency stability, the interface circuits (10-9), etc.

In the model radar, the waveform was an up ramp covering a frequency range of approximately 300 MHz in an interval of 1.134 milliseconds, the first 110 microseconds being used to stabilize the control circuits, the remaining 1.024 milliseconds supplying the data for the radar processor. The down ramp has the same values, except the slope is of the opposite sign. The CW burst will last for a similar interval.

Description of the Signal Processing

Figure 2:
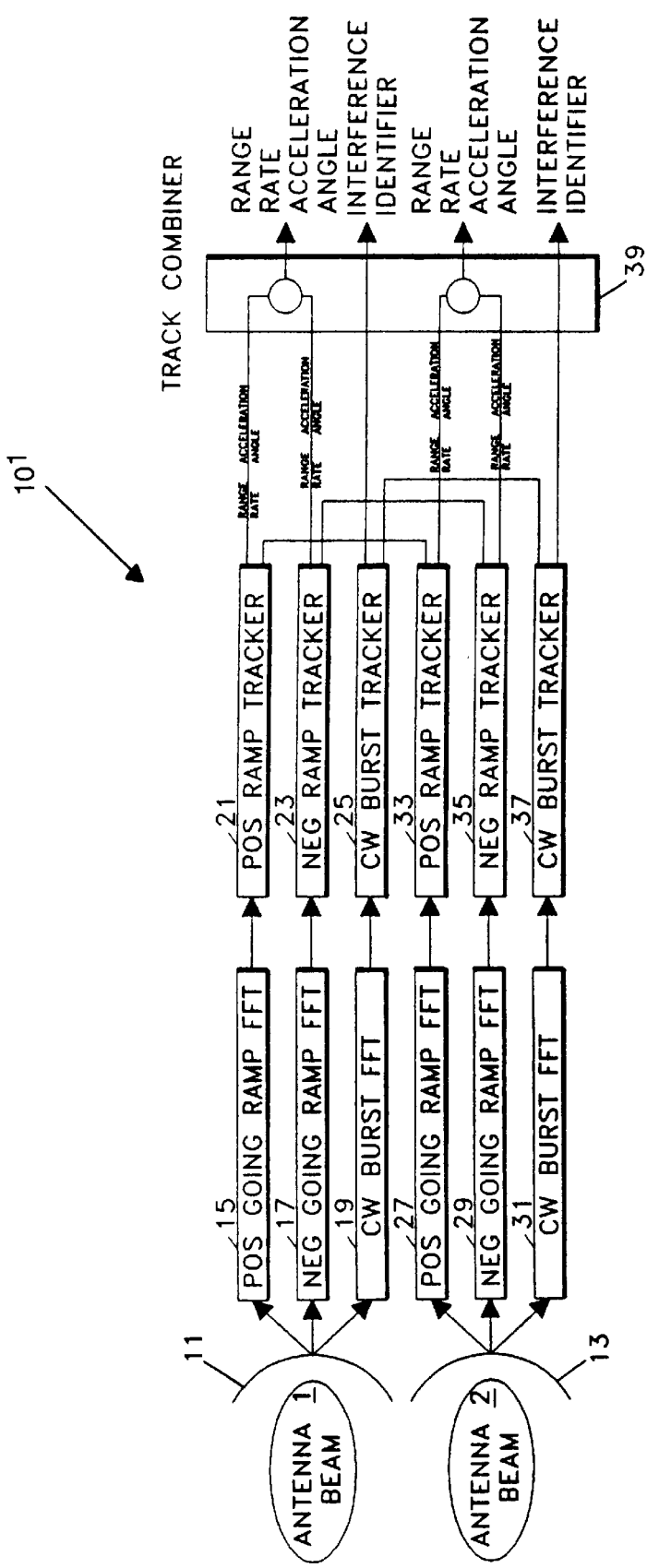
FIG. 2 is a simplified functional diagram of the information flow through the radar processor according to the invention.

Referring now to FIG. 2, a symbolic flow chart of the data processing portion of the radar sensor is shown. It includes one beam position of the receiving antenna (Antenna Beam 1) and a second beam position (Antenna Beam 2), 11 and 13, respectively. The signals derived from the first antenna beam are fed to a positive going ramp FFT (15), a negative going ramp FFT (17) and a CW burst FFT (19). The signals out of the positive going ramp FFT, the negative going ramp FFT and the CW burst FFT are fed, respectively, to a positive ramp tracker (21), a negative ramp tracker (23) and a CW burst tracker (25). During the next radar action, the signals will be derived from the second antenna beam. They will be fed to the positive going ramp FFT (27) (the same equipment, but at a different time), the negative going ramp FFT (29) and the CW burst FFT (31), and thence to the positive going ramp tracker (33), the negative going ramp tracker (35) and the CW burst tracker (37).

The trackers can determine the range, range rate and acceleration of the individual targets in that beam. By their association with a particular beam, there is also a coarse angle associated with the tracks. The outputs of the ramp trackers for the first beam are then compared to those of the second beam. This allows a better estimate of the angle to the target, if it is present in both beams, by comparing the relative magnitudes of the signals in the two beams.

The stored signals from the positive going ramp and the negative going ramp are then combined into one track in a combiner (39).

Since the only difference between the negative and positive ramps' measurements of $f_{pos}$ and $f_{neg}$, and therefore the ramp processing, is the negative sign in the relative range contribution to the measured ramp frequency, only the negative ramp will be discussed, the positive ramp functions the same way, just with slightly different frequencies.

If we assume that ten targets exist in Antenna Beam 1, conventional systems would attempt to sort 100 ($10^2$) targets in range and range rate and over subsequent antenna beam 1 samples, the incorrect pairing would have to be filtered out. In the radar sensor 10', the ten targets are tracked separately in frequency for the positive and negative going ramps. Therefore, at most only ten target tracks would exist for each ramp in the ideal situation.

From a ramp frequency track, we can deduce a close approximation to range and range rate as shown herein. Assume a three state frequency tracking filter, which tracks frequency $f$, frequency rate (velocity) $\dot{f}$, and frequency acceleration $\ddot{f}$, is used. It can be shown that the relation between $f$, $\dot{f}$ and $\ddot{f}$ and $R_{rel}$, $V_{rel}$, $A_{rel}$ is:

$$f = C_1 R_{rel} + C_2 V_{rel}$$

$$\dot{f} = C_1 V_{rel} + C_2 A_{rel}$$

$$\ddot{f} = C_1 A_{rel}$$

where $R_{rel}$ is relative range, $V_{rel}$ is the relative range rate (velocity) and $A_{rel}$ is the relative acceleration between a target (not shown) and the radar sensor 10' where $C_1$ and $C_2$ are derived from the FM slope of the ramps and the radar carrier frequency. Using the inverse of this relationship, estimates of range, range rate and acceleration can be derived separately from each ramp frequency track. The values for $\dot{f}$ are found by taking the differences between the frequency measurements of sequential radar actions, and dividing them by the time between them. Values of $\ddot{f}$ are found the same way, using the differences in the values of $\dot{f}$.

Similarly, this frequency tracking occurs in the positive going ramp. Therefore, for each target, there exist two tracks which estimate the target's range, range rate and acceleration. Now the frequency combining done in typical FMCW systems can be performed with minimal occurrence of incorrect frequency pairing. This pairing produces smoothed range and velocity estimates.

Figure 3:
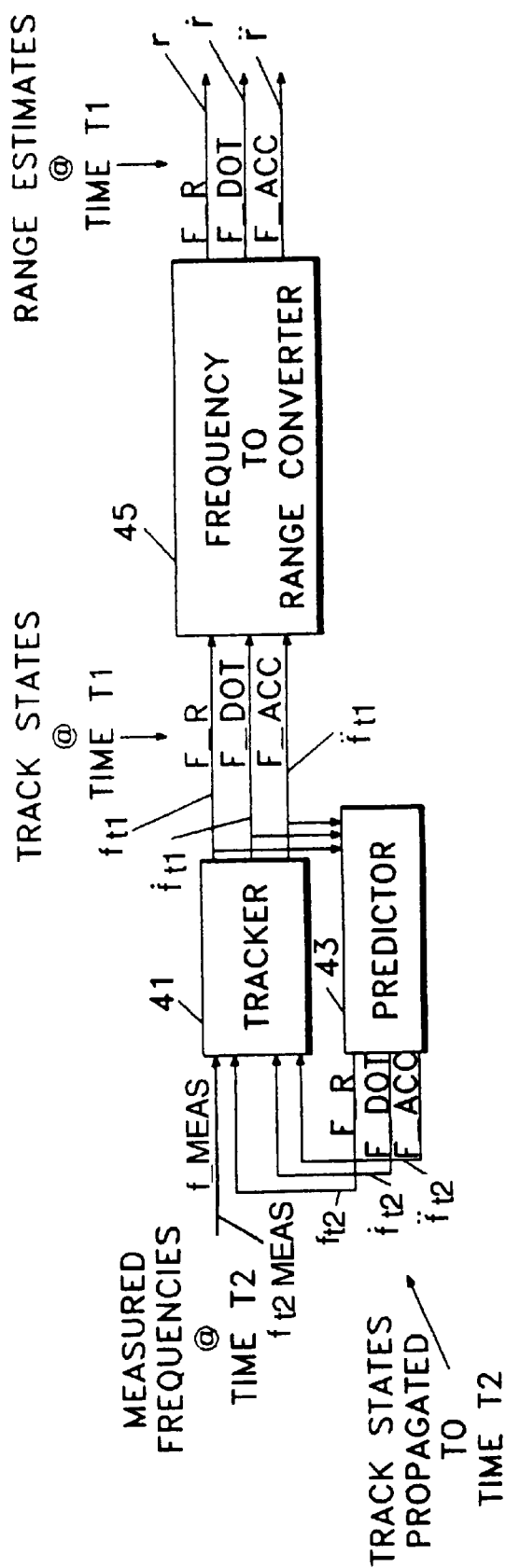
FIG. 3 is a block diagram showing the signal processing that propagates track states in time according to the invention.

Referring now to FIG. 3, a graphical depiction of the frequency tracking process is shown. As described hereinabove, both ramps estimate target range and range rate. In the event that the data contained in one ramp cannot be used (i.e. signal is not above sensor threshold, etc.), an estimate of the range and range rate can be made from the data in the other ramp. In addition, if a neighboring antenna beam can detect the same target, we have the ability to update the current track with the neighboring antenna beam data.

From a measured frequency signal, $f_{t1\ meas}$, taken at time, t1, a tracker 41 provides track states of frequency, $f_{tn}$, frequency rate, $\dot{f}_{tn}$, and frequency acceleration, $\ddot{f}_{tn}$.

TABLE 1

Track States

| Measurement Time | Measured Frequency | Calculated Rate | Calculated Acceleration |
|---|---|---|---|
| $t_1$ | $f_{t1}$ | — | — |
| $t_2$ | $f_{t2}$ | $\dot{f}_{t2}$ | — |
| $t_3$ | $f_{t3}$ | $\dot{f}_{t3}$ | $\ddot{f}_{t3}$ |
| $t_4$ | $f_{t4}$ | $\dot{f}_{t4}$ | $\ddot{f}_{t4}$ |
| ● | ● | ● | ● |
| ● | ● | ● | ● |
| ● | ● | ● | ● |
| $t_{n-1}$ | $f_{tn-1}$ | $\dot{f}_{tn-1}$ | $\ddot{f}_{tn-1}$ |
| $t_n$ | $f_{tn}$ | $\dot{f}_{tn}$ | $\ddot{f}_{tn}$ |
| $t_{n+1}$ | $f_{tn+1}$ | $\dot{f}_{tn+1}$ | $\ddot{f}_{tn+1}$ |
| ● | ● | ● | ● |
| ● | ● | ● | ● |
| ● | ● | ● | ● |
| $\dot{f}_{tn} = (f_{tn} - f_{tn-1})/\Delta t$ | | $\ddot{f}_{tn} = (\dot{f}_{tn} - \dot{f}_{tn-1})/\Delta t$ | |

Table 1: Track States

The signals in frequency domain are then converted to range estimates by frequency to range converter 45 to provide the track states of range, r, range rate, $\dot{r}$, and acceleration, $\ddot{r}$. The track states of frequency, $f_{t1}$, frequency rate, $\dot{f}_{t1}$, and frequency acceleration, $\ddot{f}_{t1}$ are also fed to predictor 43 wherein the track states are propagated from time, t1, to time, t2, to anticipate what the track states should be at the time of the next dwell, t2. The predicted track states from the output of the predictor 43 of frequency, $f_{r2}$, frequency rate, $\dot{f}_{r2}$, and frequency acceleration, $\ddot{f}_{r2}$, are fed back into the tracker to await the next data input.

Now we can propagate the frequency under track from the previous dwell to current time (one dwell) and check if the frequency under track exists in the current ramp and beam. If it does, the frequency under track is updated using track algorithms. If it does not, the frequency under track is checked to see if it exists in the same ramp in the neighboring beam. If it does, the neighboring frequency is propagated to the current ramp and beam and the frequency under track is updated using the neighboring frequency. If it does not the frequency under track is updated with the propagated frequency states. Since target tracking occurs in the measurement domain, the capability exists to predict when targets and/or object measurements under track will conflict. By predicting the time of these conflicts, we can perform additional sensor processing to prevent target misassociation in these instances.

Most targets of interest will have a low relative velocity with respect to the sensor. High speed targets or objects typically will not be the target of interest. Therefore, during frequency tracking, high speed objects will have a low priority for being updated. By combing the positive and negative ramp as in typical FMCW systems, and using the CW Burst as shown in FIG. 2 to verify the presence of an high speed object, high speed objects can be identified and their priority changed accordingly.

In a typically congested highway the majority of the targets will be in an area in front of the sensor that is only a few degrees wide. The antenna beams should therefore be relatively narrow in order to differentiate the angular position of the various objects, both on and off the roadway. Furthermore, the choice of the radar modulation parameters must be made with the constraints of the expected target velocities and ranges that will be encountered.

A set of target parameters can be set up to determine which targets are candidates for the primary target category. Initially the radar sensor will search a field of view and select a vehicle to track. It will select the closest target in the same lane as the radar sensor as the primary target. If no target exists in front of the sensor, then the closest vehicle in an adjacent lane is selected. This target must satisfy the same parameters as before except for the value of the angle. If no target satisfies the requirements, then no primary target is designated.

Secondly, the sensor must follow (maintain a track on) the selected primary target when so instructed. This instruction can be by the vehicle operator, or it can be done automatically, depending upon the mode of operation desired. However instructed, once the follow command is received, the sensor will continue to follow the current primary target unless one of the target parameters is exceeded, or until another target comes between the sensor and the followed target.

The set of target parameters can include the target range limits, velocity limits, target acceleration and deceleration limits and targets angle limits. The sensor can track primary target deceleration to zero velocity, but will cease tracking when the sensor velocity reaches a specific minimum value (i.e., the sensor stops tracking when the sensor platform vehicle is moving too slowly or stops.) Tracking also stops when another vehicle comes between the sensor and the existing primary target. In this case, the sensor returns to the acquisition mode and selects another primary target (usually the intervening target).

Description of the Control Functions

Figure 4:
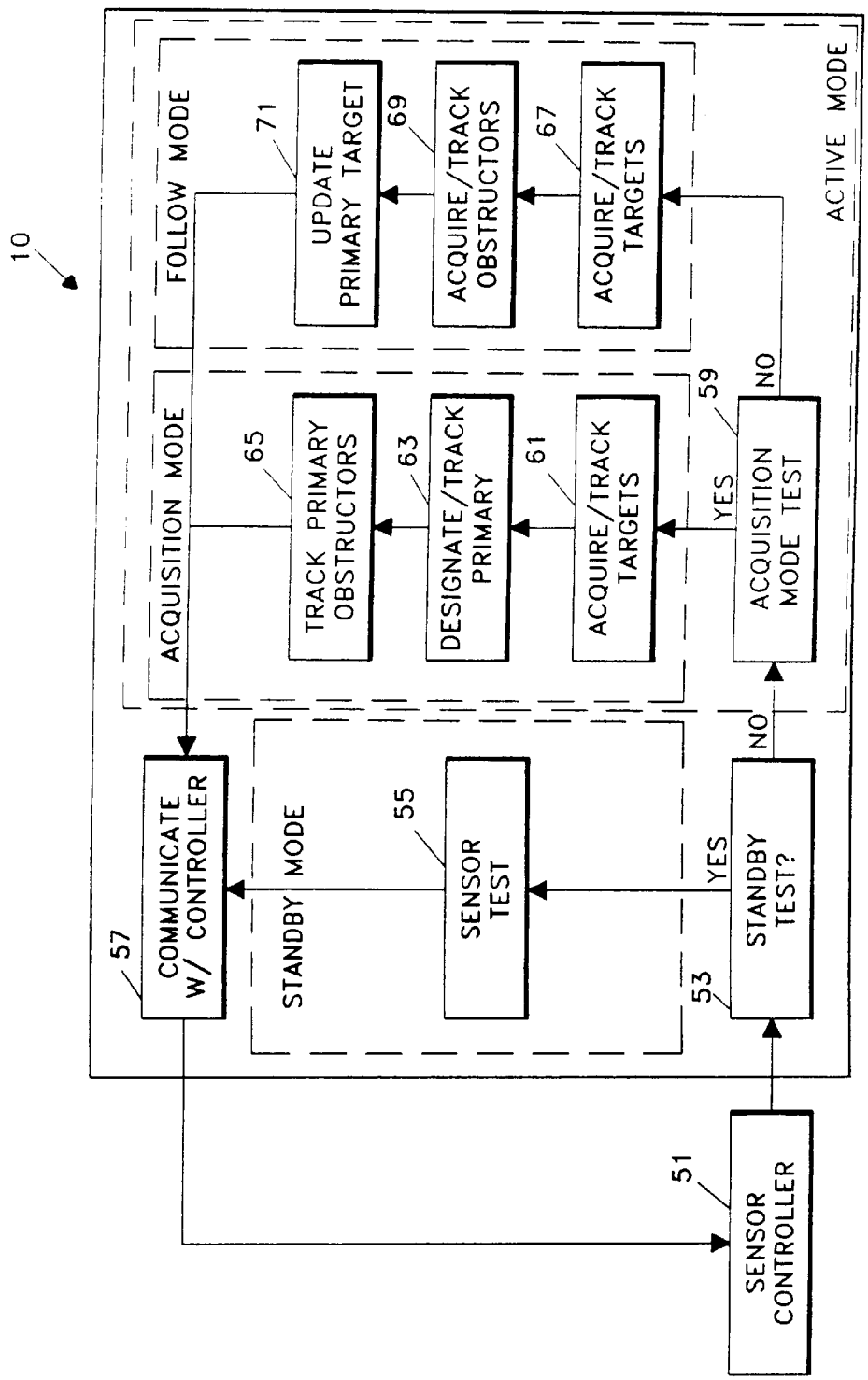
FIG. 4 is a simplified block diagram of the signal processing control functions according to the invention.

Referring now to FIG. 4, a simplified flow diagram of the various sensor modes is shown. The sensor 10 can be in standby, acquisition, and follow mode as controlled by a sensor controller 51. Both the acquisition and follow mode are considered part of the active mode of the sensor 10. When first initialized, the sensor 10, as controlled by the sensor controller 51, follows a series of process sequences. First a decision block 53 is processed wherein it is decided whether to initiate the standby mode or the active mode. When in standby mode, the sensor 10 perform various initialization routines as shown by sensor test block 55. These routines include a built in system test, track file initialization, and A/D minimum attenuation selection. The results of these test are fed to a communication block 57 which stores the information to pass the information to the sensor controller 51 as necessary. At no time during standby mode is the sensor 10 allowed to radiate.

When in active mode, a decision block 59 decides whether to enter the acquisition mode or the follow mode. In the acquisition mode, the sensor 10 locates and tracks all moving targets in the field of view as shown by acquire/track targets block 61. From the track list created, the sensor 10 selects a primary target to follow and tracks this primary target as shown by designate/track primary block 63 and separately tracks all targets that may interfere with the primary target as shown by Track Primary Obstructors block 65. When the primary target selected no longer meets the initial requirements as described hereinabove, a new primary target is designated. The tracking information is fed to the communication block 57 which stores the information to pass the information to the sensor controller 51 as necessary.

When the sensor 10 is in the follow mode, the primary target selected and tracked in acquisition mode, is tracked as shown in acquire/track targets, block 67, and will have the primary target designation unless the target leaves the field of view, meets the criteria to loose track or the sensor 10 is commanded to the acquisition or standby mode. Any potential obstructors are tracked as shown in Acquire/Track Obstructors block 69 and the primary target information is continuously updated as shown in update primary target block 71. The primary target and obstructor information is fed to the communication block 57 which stores the information to pass to the sensor controller 51 as necessary.

The sensor processing is nearly identical for both the acquisition and the follow mode as described. The difference is in the control. The acquisition mode will track all targets in the field of view and allows the selection of a new primary target without external sensor communication. The follow mode will track only the followed target and a certain number of nearby targets, and can be initiated by either manual or automatic control. Once in the follow mode, the main objective of the sensor is to maintain a track on the primary target and determine if any other targets intersects the line of sight between the sensor and the primary target.

A large amount of data is obtained from tracking the entire field of view which makes it difficult to maintain a strong track on the primary target in a low cost design implementation. By using a reduced set of data with a second target tracker, the probability of maintaining a strong track of the primary target is increased. Therefore, once the FOV tracker has identified the primary target, a reduced view (RV) tracker is created to track the primary target and targets which might interfere with the primary target (interferers).

Overall Description of the Processor

Figure 5:
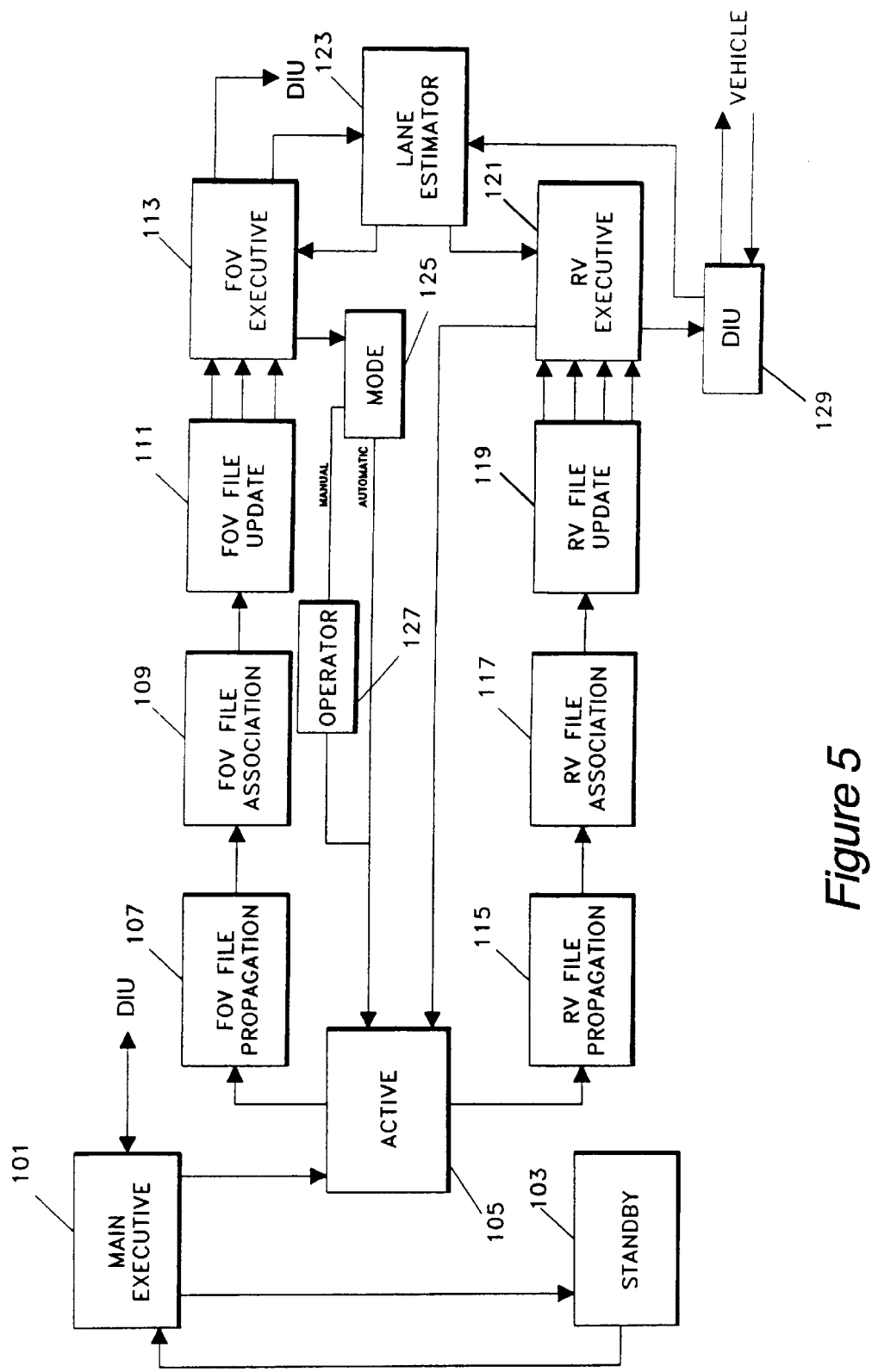
FIG. 5 is a sketch showing a simplified flow diagram of the signal processor.

Referring now to FIG. 5, an overall view of the processing algorithms will be described. Each of the blocks shown here are described in greater detail in later diagrams.

The Main Executive 101 is the master control element in the processor, determining the choices described in FIG. 4. Among other functions, it includes blocks 51, 53 and 57 of FIG. 4. It determines that the sensor will be in either the standby or the active mode. If in the standby mode, block 103 is activated. If in the active mode, block 105 is activated, where the choice between acquisition and follow functions will be made.

The acquisition function is carried out in the Field of View (FOV) tracker, the top portion of the diagram of FIG. 5. The overall functions are the File Propagation 107, the File Association 109, the File Update 111 and the Executive 113. The FOV tracks all targets in the field of view, both moving and stationary.

Similarly, the follow functions are carried out in the Reduced View (RV) blocks on the lower portion of FIG. 5. This includes the File Propagation 115, the File Association 117, the File Update 119 and the Executive 121. The RV tracks the follow target and all others within a specified range around it, being capable of determining when a nearby vehicle can interfere with the track of the followed target.

Both the FOV and the RV have outputs to the platform vehicle. In the demonstration radar, both output went to a computer to show the location of the various targets on the computer screen (in different colors). In a final application, the FOV output may only be required for maintenance or trouble shooting, while the RV output would be the information link between the sensor and the platform vehicle, to control its brake and accelerator, and possibly an alarm system. This exchange is done via the Digital Interface Unit (DIU) 129.

Working from data received from both the FOV processing and the platform vehicle, the Lane Estimator 123 can tell when the roadway ahead is not straight, so that all the tracked targets, but especially the followed primary target, can be expected no wander from the line directly in front of the sensor vehicle. Its output is fed to both the FOV and the RV executives to order for them to make the appropriate decisions about the location of the various targets.

The selected primary target information is shown leaving the FOV Executive 113 and going to the Mode block 125, although this block is optional in the radar. Here it illustrates that there can be a choice between manual control (Operator, block 127), or automatic control of the follow function, whereupon the information goes to the Active block 105. One function of the Active block 105 is to set a flag on the track of the primary target which will determine which track creates the RV output. Otherwise, it directs all data to the FOV tracker but only that of the primary target and any other targets within a specified distance (range and angle) of the primary target to the RV tracker.

A Brief Overview

Before departing on a detailed explanation of the processing required for target tracking and primary target processing, a brief overview is helpful. The initial goal of the tracking system is to locate the nearest trackable target which satisfies primary target requirements. Primary target requirements are in polar coordinates and therefore, the frequencies obtained in the CFAR detection lists must be transformed to equivalent range and range rates for all targets in the field of view. The tracking function that lists all targets in the field of view is called the Field of View (FOV) tracker. From this collection of range and range rates for all detected targets, the primary target can be selected.

In order to track target frequencies, estimates of the frequency, frequency rate, and frequency acceleration are made in frequency space for each frequency detected in the FFT for each dwell based upon its prior history. By predicting the location of the frequencies based on the tracked frequency estimates, the probability of matching one target's track frequency track with another target's measurement is reduced. Once the targets are tracked in frequency in both the up and down ramp, a transformation from frequency to range and range rate can be made even though range, range rate coupling is present. The conversion of the ramp tracks to range results in two range, range rate representations for each target. These two representations correspond to the up and down ramps tracking the same target. By comparing the two ramp tracks in polar coordinates, an improved combined estimate of the range and range rate of each target can be made.

Target location information is required to properly select the primary target. Initially, the primary target would be selected by being located in the same traveling lane as the sensor vehicle. Using the sequential lobing information, it is possible to estimate target angle and therefore an estimate of the target location can be made. Using the track information obtained, the primary target can be selected. Once selected, the Reduced View (RV) tracker is activated, with its focus centered about the primary target's frequency locations.

Detailed Description of the Processor

Figure 6:
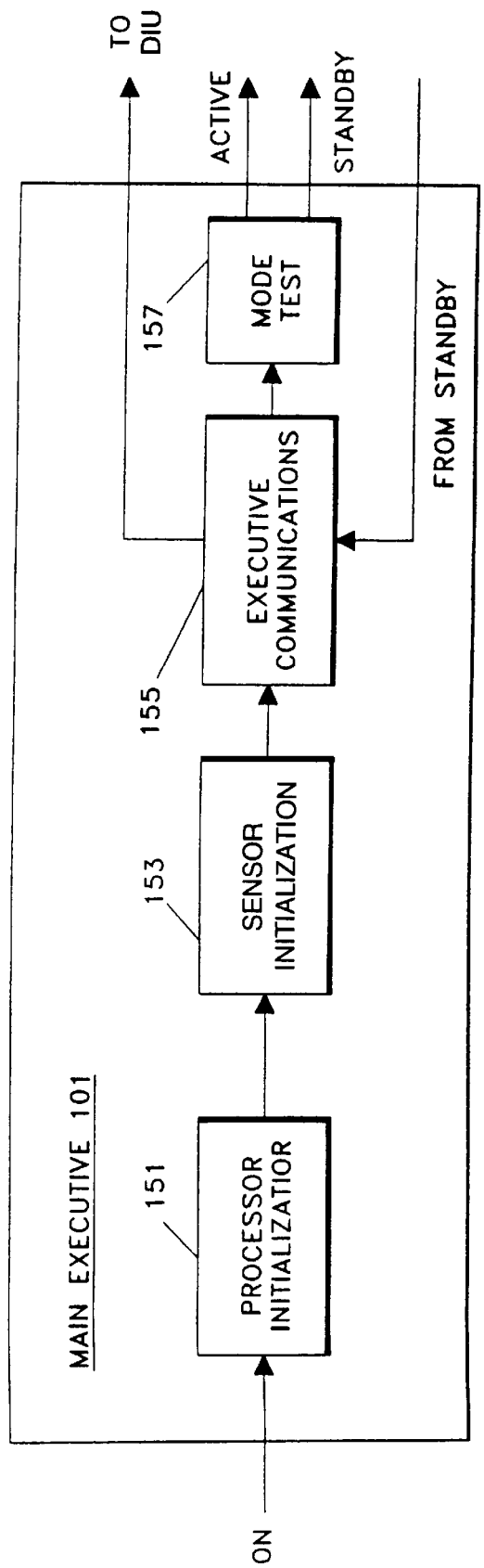
FIGS. 6 through 10 are sketches showing detailed flow diagrams of the individual blocks of FIG. 5 according to the invention.

FIG. 6 shows the details of the Main Executive 101. The processor starts with a Processor Initialization 151, wherein the Digital Signal Processor (DSP) performs self tests and loads the sensor code from ROM initializing all values to their respective predetermined values.

Next, a Sensor Initialization block 153 is executed to initialize the sensor 10 followed by an Executive Communications block 155 wherein handshaking with the Digital Interface Unit and a Communications Controller is checked for proper functionality. A Mode Test block 157 is then executed to determine if the sensor is in the standby mode or the active mode.

Figure 7:
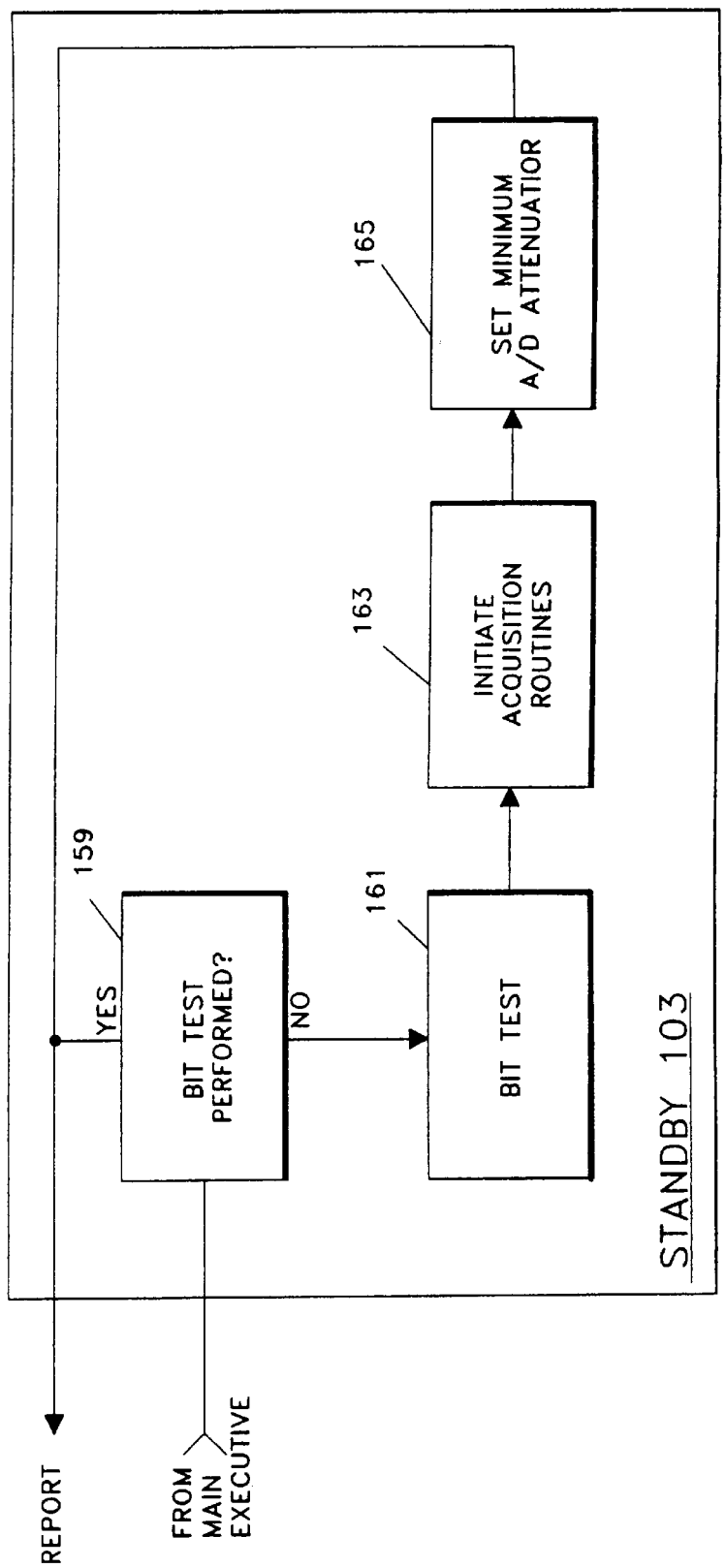

The sensor 10 is put in the standby mode 103 (FIG. 7) whenever the sensor 10 is in an inactivated state. During standby mode, the sensor will perform three functions. The system performs a Built In System Test (BIT) block 161, Initialization of all Acquisition Routines block 163 and setting the minimum attenuation level of the A/D block 165 corresponding to the thermal noise of the receiver. The sensor 10 when placed in the standby mode performs a Built In Test (BIT) performed decision block 159 wherein if a BIT test has already been performed, a loop back to the Executive Communication block 155 is performed. If a BIT test has not been performed, a BIT Test Block 161 is executed wherein prior to RF illumination, the sensor electronics (i.e. the digital signal processor, the digital interface unit, etc.) are tested for proper operation. The sensor 10 returns the BIT status to the Sensor Controller 51 (FIG. 4). Next, initialization of all acquisition routines block 163 is performed wherein all system information required to enter acquisition mode is set accordingly. Finally, setting the Minimum Attenuation Level of the A/D block 165 is performed. Ideally, the A/D of the receiver would measure no signal into the digital signal processor (DSP) when the radar is not illuminating. Due to the thermal noise of the sensor 10, the AID will sample a non-zero signal into the A/D. This signal does not correspond to any valid target information and therefore should never be considered as viable target information. This requires the minimum attenuation level of signals into the AID to be set such that the thermal noise is attenuated to set the thermal noise input to toggle N LSB's of the A/D where N is a preset value that is greater or equal to 1. This establishes adequate dither noise. Therefore, the A/D samples the thermal noise during standby mode and the minimum attenuation level needed as controlled by the attenuator in the microwave receiver, block 10-4 of FIG. 1, is set accordingly.

When the sensor 10 is commanded from standby mode to the active mode, the radar is initialized and activated. Once initialized, the sensor 10 automatically enters the acquisition mode. Whenever the radar is operational and active during the current dwell, the radar will sample the environment, derive the corresponding frequency spectra, convert the received frequency spectra to an appropriate center frequency for the processor, and locate target signals in the spectra.

Figure 8:
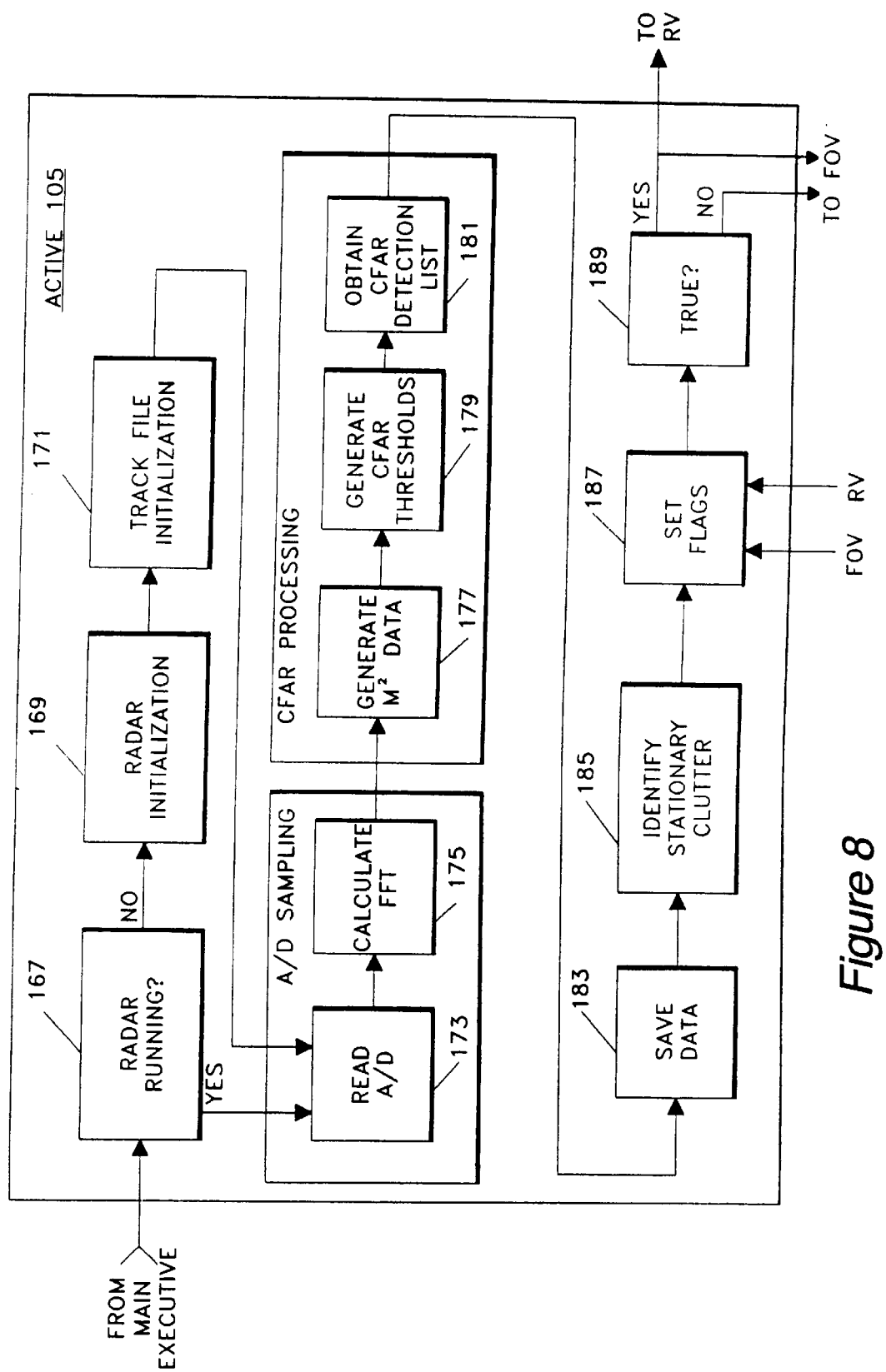

Referring now to FIG. 8, when placed in the active mode, the sensor 10 executes a Radar Running Decision block 167. If the radar has not been running, a Radar Initialization block 169 is executed wherein the transmitting frequency and waveform shape are fixed. Upon entering the active state of the system, the transmitter is commanded to radiate. The sensor 10 then analyzes the waveform sections for proper operation. An appropriate attenuation level for the A/D's for each beam/ramp is set.

After radar initialization, an Initialize Track Files block 171 is performed wherein all FOV track files are reinitialized. Reinitialization is achieved by setting the track files to their inactive state. In addition to FOV track files, all sampled data and system constants for all ramps and CW bursts are reset to their inactive states. The variables that are initialized and their corresponding initialized values include:

A/D Attenuation Levels: A/D Minimum Level
FFT Sampled Data: Empty
All Track Files: Inactive
Primary Target: Invalid
Time: 0.0 seconds The sensor 10 next executes a Read A/D block 173.

At Decision block 167, if the radar had been running, then the sensor 10 executes the Read A/D block 173. The A/D's sample the three waveform sections (i.e. up ramp, down ramp, CW burst) for each beam. The processor then calculates the FFT's associated with the three waveforms, determines the constant false alarm rate (CFAR) threshold, and locates all frequency signals above the CFAR threshold. Based on the magnitude of the A/D saturation count, the sensor 10 may adjust the A/D attenuation level to prevent A/D saturation as well as the possibility of discarding the measurements. In the model radar, the A/D samples 1024 data points for each waveform section. The sampling rate of the A/D for each waveform is 1 MHz. Including dead time, the processing time needed to perform all algorithm calculations, the A/D requires approximately 5 msec to sample the three waveforms. This results in the following approximate filter resolutions:

| Waveform | Filter Spacing | Filter Resolution |
| --- | --- | --- |
| Up Ramp | 970 Hz 0.55 M | 1.4 kHz 0.8 M |
| Down Ramp | 970 Hz 0.55 M | 1.4 kHz 0.8 M |
| CW Burst | 970 Hz 1.9 M/S | 1.4 kHz 2.7 M/S |

If the A/D saturation count exceeds a predetermined value, the A/D data will be ruled invalid for this beam/ramp combination. Subsequently, the A/D attenuation level will be increased according to the amount the A/D saturation count exceeds the specified threshold. The trackers still perform their function even though no sampled data is obtained for this beam/ramp combination. Next, a Calculate FFT block 175 is performed wherein to improve the FFT filter sidelobes obtained from the sampled data, the sampled data is weighted using a Hanning weighing function ($\cos^2$). Once weighted, a 1024 point FFT is taken on the sampled data. The output of the FFT (frequency and magnitude) is stored in system memory.

To obtain a CFAR detection list, a three step process is performed on the weighted FFT data. First a Generate Magnitude Squared Data block 177 is executed wherein the magnitudes of the sampled data is squared. Next, a Generate CFAR Thresholds block 179 is performed wherein these squared values are used to obtain the CFAR threshold.

The CFAR threshold is generated in four steps.

1) The magnitude squared of the complex up and down ramp FFT results are computed and stored.

2) A CFAR average censoring array is computed to reduce the effects of magnitude squared array peaks on the generations of the CFAR threshold.

A temporary array of magnitude squared terms are created. Starting at the FFT cell corresponding to the lowest frequency of interest for the down ramp, and the highest frequency of interest for the up ramp, the leading and lagging sliding window sum for each cell of interest is computed. For each cell, the smaller of the leading and lagging averages, are selected, the average scaled and compared to the magnitude squared of the cell of interest in the temporary array. If the value of the cell of interest exceeds the average, the cell of interest is replaced in the temporary array with the scaled average. The smaller of the scaled leading and lagging averages is transferred to the destination sensor average array.

3) A CFAR threshold is computed to compare magnitude squared terms for detections.

Each magnitude squared term is tested against the scaled censor average term computed for that cell. If the magnitude squared term is greater, then the scaled censor average term is substituted for that magnitude squared term generating a censored magnitude squared term array.

For each cell of interest a leading and lagging average term is computed using the censored magnitude squared term array. The larger of these two averages is selected and scaled and stored as the CFAR threshold term for that cell.

4) The CFAR threshold is adjusted up to a bottom level. A bottom level table is defined which is the theoretical magnitude squared response for some nominal radar cross section target as a function of range. The CFAR threshold for each cell is compared to the bottom level value for that cell, and the larger of the two values is retained as the CFAR threshold term.

The squared values are also used in angle estimation to be performed during tracking. Finally, using the CFAR threshold calculated, an obtain CFAR Detection List block 181 is performed wherein a list of all frequencies to cross threshold is created. This data is then saved by Save Data block 183 in memory.

The A/D sampling and CFAR processing is performed three times for each beam for each major dwell. A major dwell is defined as the total number of beam dwells with three waveform sections for each beam. A beam dwell is defined as three waveform sections in one beam which includes the up (or positive) ramp portion, the down (or negative) ramp portion and the CW burst portion of the waveform. For all ramps and bursts sampled, the FFT magnitudes, CFAR detection's, time of sampling and attenuator gain levels are recorded in digital memory.

Prior to target tracking, the CFAR detection list is analyzed and edited to assist the different objectives of the two trackers used. Stationary clutter is identified to prevent the trackers from jumping track to stationary objects as well as to minimize the number of tracks performed. Beam sidelobe characteristics may cause targets included in one beam to be detected in the neighboring beams. In addition to the CFAR threshold, a filter sidelobe threshold may be required to suppress detection of these sidelobe targets.

An existing environment may result with a CFAR detection list, after stationary clutter identification, having too many detections for the two trackers to process. The number of CFAR detections can be reduced without compromising the trackers objectives. This editing will reduce the processor workload to realizable levels. Stationary clutter is defined as all objects which are stationary in the environment, or equivalently, all objects that are traveling at the sensor platform's speed. Stationary objects are detected in the Identify Stationary Clutter block 185 whereby the targets will have the same measured velocity as the sensor vehicle. The sensor's velocity can be determined either by the frequency measured during the CW burst, or it can be supplied to the sensor by the platform vehicle reporting its speed. If any frequency detected in the up ramp can be detected in the down ramp at: $f_{down}=-f_{up}+f_{Doppler}$, where $f_{Doppler}$ is the calculated Doppler frequency from the reported vehicle speed, then the object is considered to have a high probability of being stationary and its corresponding frequency can be tagged accordingly.

The Active block 105 also contains the provision for setting flags block 187 that identify the areas of action for the various target data coming from block 185. The source of this comes from the output of the tracking function and what is measured about the targets as described further hereinafter. Depending upon how the flags are set, target data goes either to the FOV tracker or the RV tracker, or both (block 189).

Figure 9:
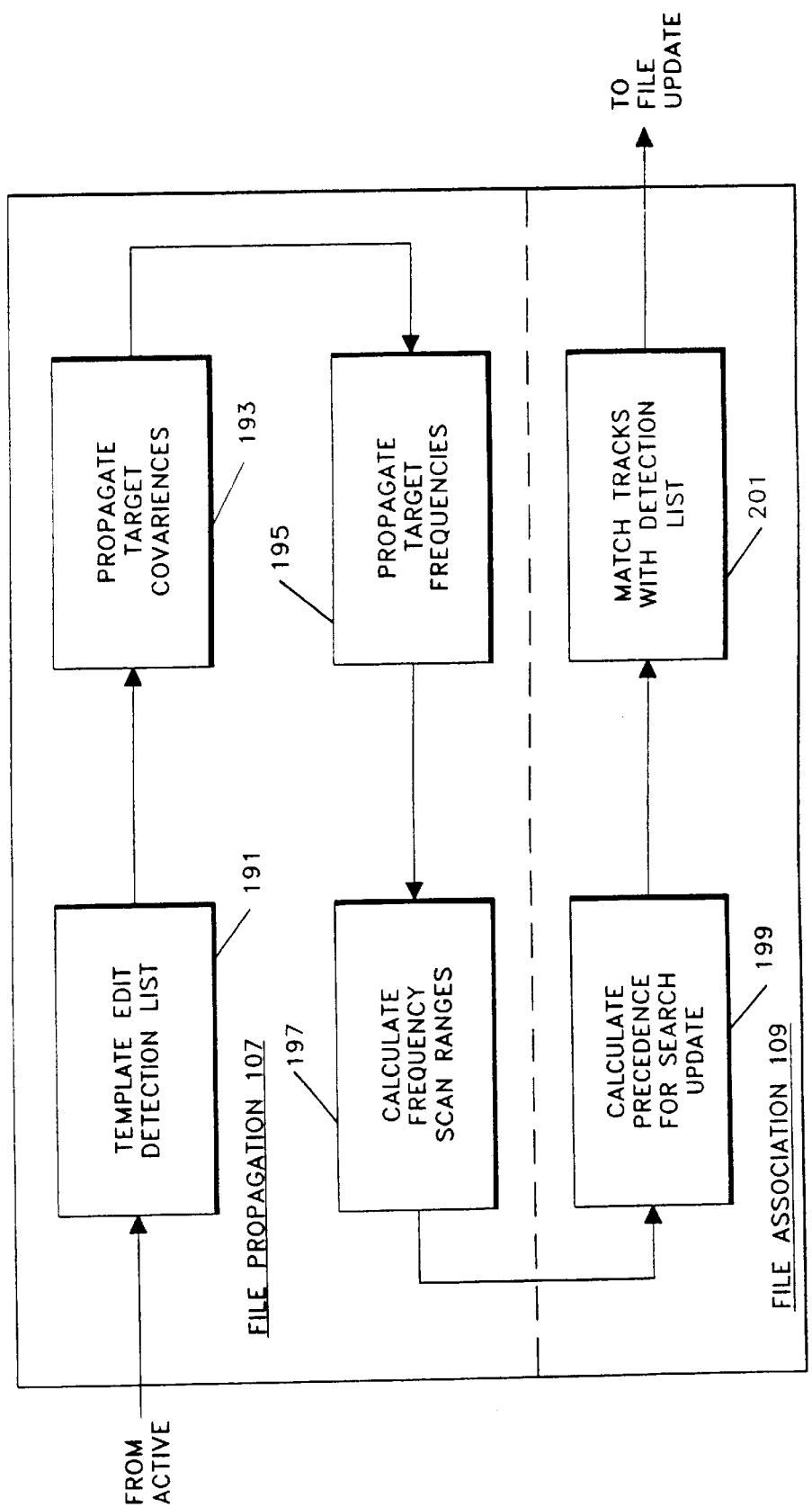

In general all data go to the FOV tracker. However, the FFT processing and CFAR detecting performed in the radar processing could result in an estimated 300 detections in a worst case scenario. To prevent overloading the processor, the CFAR detection list is edited. Target frequencies not necessary to meet the objective of the tracker objective are deleted as shown in Edit Detection List block 191 (FIG. 9). Here an FOV tracker first selects local magnitude maxima contained in the FFT. The FOV tracker then selects the largest targets separated by more than 10 range resolution bins in the field of view for tracking. Only one scatterer per target should be tracked if possible. Assuming there should only be one target every 5 meters, there should only be one vehicle every 10 bins in the ramp FFT's. By allowing only the largest detection every 10 bins, 300 detections in a worst case situation, can be reduced to 30 detections. Therefore, starting at the zero range rate bin, only the largest detection separated by more than 10 bins will be selected for tracking in the ramp FFT's.

In the CW burst, only target velocity is measured. To reduce the amount of detections, detections are allowed only in every other bin. This results in a minimum velocity difference of 3.8 m/s between tracked targets in the CW burst FFT.

An RV tracker objective is to maintain a strong track on the primary target. Thus, there is no need to track all objects in the field of view. Only the primary target and objects that may interfere with the tracking of the primary target need to be tracked. Since the sensor car is moving, the relative velocity between the sensor car and other cars moving in the same direction will be small and the time these targets interfere with the primary tend to be long. By only tracking objects in the ramp FFTs that are within 10 frequency bins of the primary target (5.5 meters for cospeed vehicles), the amount of data to be tracked is dramatically reduced.

Similarly, oncoming targets will have a high relative velocity when compared to the sensor car. To prevent these targets from interfering with the primary target, they need to be tracked at a farther range. At a maximum differential speed expected (i.e. 107 meters/sec), the oncoming target will be moving approximately 10 bins per major dwell. Therefore, the RV tracker will track objects in the ramp FFT that are at most 20 bins ahead of the primary target. The RV suppression window allows only target peaks that are separated by more than 1 bin. Therefore, in the cases where targets are separated by less than 2 bins, the smaller CFAR detection is deleted.

Target frequencies are tracked in the individual ramps and CW bursts of all beams. The frequency tracks are updated once every major dwell. Between updates, target frequencies will move as a function of the targets' relative velocity and acceleration to the sensor car. If this change is anticipated, there is a high probability that any frequency from the FFT found near this predicted frequency will be the target frequency of interest. If the predicted frequency is filtered with the actual measured frequency, a smoothed estimation of the target frequency, frequency rate and frequency acceleration can be obtained.

If $\Delta T$ defines the time between updates for a given beam/ramp combination and the previous estimate of target frequency, frequency rate, and frequency acceleration is $f(k-1)$, $\dot{f}(k-1)$, and $\ddot{f}(k-1)$, respectively, the predicted target frequency based on previous target frequency estimates can be written as:

$$\begin{matrix} f^{t-}(k) & 1 & \Delta T & \Delta T^2/2 & f^{t+}(k-1) \\ \dot{f}^{t-}(k) = & 0 & 1 & \Delta T & \dot{f}^{t+}(k-1) \\ \ddot{f}^{t-}(k) & 0 & 0 & 1 & \ddot{f}^{t+}(k-1) \end{matrix}$$

where $t^-$ and $t^+$ indicate the target track file data before and after propagation has occurred, respectively. Since this estimate is based solely on previous information, the uncertainty associated with this prediction will tend to increase with time. If P is defined as the error covariance matrix associated with the frequency estimate and Q as the uncertainty incurred due to the frequency prediction, the propagated error covariance matrix can be defined as:

$$p^{t-}(k)=\Phi(\Delta T)P^{t+}(k-1)\Phi(\Delta T)^T+Q$$

where $\Phi(\Delta T)$ equals:

$$\Phi(\Delta T) = \begin{matrix} 1 & \Delta T & \Delta T^2/2 \\ 0 & 1 & \Delta T \\ 0 & 0 & 1 \end{matrix}$$

These definitions are attributed to using a Kalman filter for updating the frequency estimates. It should be appreciated that the prediction just given will not be exact. A window in the FFT needs to be defined, in which to search for the propagated target frequency of interest. The error covariance matrix just given defines a variance or error range in which to expect the target of interest. Therefore, the search window is defined as $\Delta f_{scan}=\pm 3\sqrt{P^{1-}(k)_{11}}$ centered about $f(k)$, where $P(k)_{11}$ is the (1,1) element of the error covariance matrix at the $k^{th}$ time sample. This window is the region in which the target frequency under track will most likely be found. Based on the estimated frequency error, this frequency window may decrease to an unacceptable size. To prevent an excessively small search window, frequency window sizes are limited to a lower limit bound of ±3 bins.

There typically will be more than one target in each beam/ramp combination. A method needs to be defined to associate the current frequencies under track and the frequencies currently seen in the current FFT. By propagating all frequencies contained in the beam/ramp to the current time, it is possible to match all the target files with current FFT measurements with a high probability of not misassociating the targets' frequencies (i.e. track frequency for target "A" matched with measured frequency for target "B"). The estimation will not be precise. An error region must be defined in which the differential error between the FFT and the track frequency will be found. The FOV and RV tracker file association methods differ and therefore will be discussed separately.

One major FOV tracker objective is either to identify the primary target or locate those targets that intersect the line of sight to the primary target. In either case, the current primary target is not an important interest and therefore no special emphasis should be placed on processing the current primary target. By placing emphasis on the current primary target, it is possible to incorrectly influence the selection of a new primary target.

To decrease the probability of target misassociation in the RV tracker, only one track file is allowed to match with a measured frequency. By allowing only one match, the likelihood that two tracks will be tracking the same target will be decreased. Unfortunately, by allowing only a one to one correlation, an order must be defined in which the target frequencies under track will attempt to match with the frequencies measured. This will tend to prevent target "A" from updating with a measurement for target "B". It is assumed that the longer a target has been successfully tracked, the more likely the target will continue to be successfully tracked. Therefore, the target track files are updated with respect to the overall time they have been tracking a given target. The oldest track file will be the first track file in which a match is attempted.

Using the just defined precedence, the FOV target files are matched with the frequencies measured in the FFT. If the difference between the predicted frequency and a measured frequency is within the frequency search window defined above, the FOV target file and measured frequency are considered matched and tagged accordingly. This tagged measurement can no longer be associated with another FOV target file. If a measured frequency cannot be found within the search window, the FOV target file is considered unmatched and tagged accordingly and the next FOV target file listed in the order of precedence is considered. If more than one FFT measurements fall within the FFT frequency search window, the closest measured frequency to the predicted frequency is selected.

Referring again to FIG. 9, to accomplish the latter, a Propagate Target Covariances block 193 is executed to predict the uncertainty in the frequency predicting term and thus defining the frequency match bound. Next, a Propagate Target Frequency block 195 is executed wherein the target frequency tracks are propagate from the previous sampling instant to current time. Next, a Calculate Frequency Scan Range block 197 is executed to define the frequency search window which is the region the target frequency under track will most likely be found. Next, a Calculate Precedence for Search Update block 199 is performed to define the order in which target frequencies under track will attempt to match with the measured frequencies. The oldest track file will be the first track file in which a match is attempted. A Match Tracks With Detect List block 201 is executed wherein the target files are matched with the frequencies measured in the FFT. If the predicted frequency and the measured frequency are within the frequency search window, the predicted frequency and the measured frequency are termed matched and tagged accordingly. If a measured frequency cannot be found within the search window, the FOV target file is tagged as unmatched and the next FOV target file in order of precedence is attempted to be matched. If more than one FFT measurement falls within the FFT frequency search window, the closest measured frequency to the predicted frequency is selected.

During Reduced View (RV) file association, the primary object is to maintain the best possible track on the primary target as possible. Therefore, the primary target takes precedence in all association operations and different processing is performed for RV file association and update, as to be described. Like the FOV update precedence, only one target frequency can be associated with a frequency detected in the FFT. Since the primary target is the reason for the RV tracker, the primary target takes precedence in RV detection association. To assure that targets closely spaced to the primary target do not interfere with the primary target, the remaining RV track files are updated with respect to their distance in frequency from the primary target's frequencies. Therefore, the closest target in frequency to the primary target will be associated after an attempt to associate the primary target frequency has been made.

Using the previously described precedence, the RV target files are matched with the frequencies measured in the FFT. If the difference between the predicted frequency and a measured frequency is within the frequency search window as defined herein above, the search target file and measured frequency are considered matched and tagged accordingly. This tagged measurement can no longer be associated with another RV target file. If a measured frequency cannot be found within the search window, the RV target file is considered unmatched and tagged accordingly and the next RV target file in the order of precedence list is considered. If more than one frequency is included within the frequency search window, the closest frequency to the predicted frequency is selected.

If the primary target fails to associate with a measured frequency, a larger search window is defined and association is attempted again after all other RV tracker files have been associated tested. If this association of the primary target fails, processing is performed to find another measurement of the primary target in order to continue updating the primary tracker. After all target files have been attempted to be associated, the target files are updated according to their detection match status.

A valid target will typically be seen from dwell to dwell in some ramp/beam combination. Knowing this, in order for a target to initiate a track, it must be seen three times in the same beam in three major dwells. This prevents creating unwanted track files on noise that has crossed the threshold. In addition, since targets typically are frequently seen in some ramp/beam combination from dwell to dwell, then any target not matched for some given time is deleted. When targets are interfering with the primary target track in the RV tracker, a different track file update process for the primary and interfering targets is used. In those cases when the primary is not being interfered, the update process for the RV tracker is similar to the FOV tracker.

Active files that have a match in the edited CFAR detection list are updated using a Kalman filter. The Kalman filter gives a least squares estimate of the current state based on previous estimates. Given the previous track states, f(k), the associated CFAR detection frequency, $z_k$ and measurement error covariance, $R_k$, the predicted frequency estimates are now improved using the following filter equations:

$$K_k = P^{t-}(k)H^T[HP^{t-}(k)H^T + R_k]^{-1},$$
$$\overline{f}^{t+}(k) = \overline{f}^{t-}(k) + K_k[z_k - H\overline{f}^{t-}(k)],$$

where H=100.

The measurement covariance, $R_k$, is an inverted measure of the confidence in the measurement. If the measurement was truth, $R_k$ would be zero, since no error exists in the measurement obtained. $K_k$ is the Kalman gains associated with the update at time k. A large measurement error covariance, (R_K), results in Kalman gain values approaching zero. Conversely, a small error covariance indicates small measurement error and the measurement should dominate the filter update. A small $R_k$ results in a Kalman gain approaching 1.

When measurements are used in the update, the overall error associated with the estimation will decrease. The decrease in error covariance is described by:

$$p^{t+}(k)=[I-K_kH]P^{t-}(k)[I-K_kH]^T+K_kR_kK_k^T.$$

Initialized files that have a match in the detection list are set to active and are updated the same as active files are updated as described above. Active files that are not matched in the detection list can be attributed to either a fade of the target, the target has become undetectable by the sensor due to blockage by another target, the target has left the sensor's field of view or currently interfering with the primary target in the RV tracker. Except for the interfering targets, these track files are retained for two seconds in the event that the target will again be detectable by the sensor.

A Kalman filter cannot be used when no measured frequency is available, thus another method to update the current filter states is required. The best estimate of the frequency states f(k) is those states predicted by the state propagation subprocess. Therefore, the current frequency states and error covariance matrix are updated by substituting the predicted frequency states and predicted error covariance values for the current frequency and error covariance wherein:

$$\overline{f}^{t+}(k) = \overline{f}^{t-}(k),$$
$$P^{t+}(k) = P^{t-}(k).$$

If no detection is made for this target in successive dwells, the error covariance value, P, will grow due to the lack of update measurements. This increase in P will result in a larger frequency window for detection matching. This increase is desired since, over time, the propagated measurement will tend to increase in error.

There are two conditions in which target track files are deleted. Initialized targets, i.e. targets which have been seen in the previous dwell of the current beam/ramp, will be deleted if in the current dwell no target frequency is matched with the initialized target frequency. If active track files, i.e. a target track that has been seen in consecutive major dwells, is not matched with a measured frequency, an additional test must be passed prior to deleting the active track file. An inability to match the track file with a frequency may be attributed to the radar recording a intermittent fade of the target. Target tracking should continue during these fades. If a frequency track is unable to associate with the CFAR detected frequencies for two seconds of consecutive dwells, it is assumed that the target is undetectable in the field of view and the target track file should be deleted. A track file is deleted by setting it to its inactive state. All files, initialized or active which have not been deleted due to detection association matching, will be updated in some form.

Figure 10:
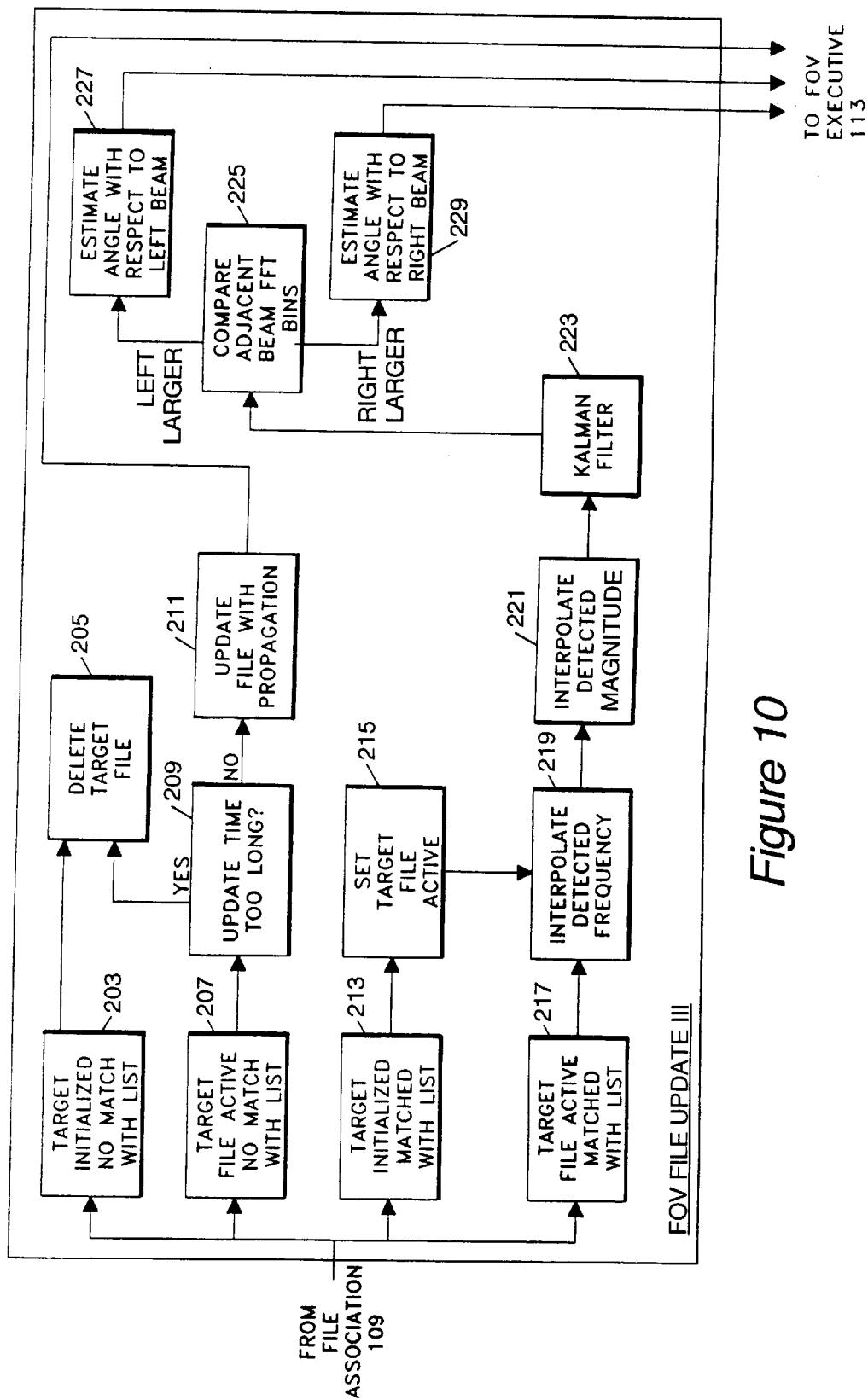

Referring now to FIG. 10, a Target Initialized No Match With List block 203 is performed wherein targets that have been initialized but did not match a current measured frequency are identified. A Delete Target File block 205 is then performed wherein the target files identified by block 203 are deleted. Alternatively, a Target File Active No Match With List block 207 is performed wherein all active target files that did not match with a measured frequency are identified. Next, an Update Time Too Long block 209 is performed wherein the target files identified by block 207 are checked for when there last was a match. If two seconds have lapsed, then the Delete Target File block 205 is performed to delete the target file in question. If two seconds have not lapsed, then an Update Target File With Propagation block 211 is performed wherein the target file is updated with a value resulting from taking the previous track frequency value propagated forward in time to anticipate what the previous value should currently be and using that value as the updated value for the target file.

A Target Initialized Matched With List block 213 is performed wherein targets which have been initialized and are matched with a measured frequency are identified. Next, a Set Target File Active block 215 is performed wherein target files for the targets identified by block 213 are set active (block 215). Completing the file update process, a Target File Active Matched With List block 217 is performed wherein target files which are active and are matched with a measured frequency are identified.

Next, an Interpolate Detected Frequency block 219 is performed wherein the estimate from the detected frequency from the FFT is improved by interpolating the true frequency based on the detected frequency signal strength and bin neighbors. Next, an Interpolate Detected Magnitude block 221 is performed wherein the magnitude value of the detection is improved by a similar interpolation process. Next, a Kalman Update block 223 is performed wherein a least squares estimate of the current state based on previous estimates is provided as described hereinabove. Next, a Compare Adjacent Beam FFT Bins block 225 is performed followed by an Estimate Angle With Respect to Left Beam block 227 or alternatively an Estimate Angle With Respect to Right Beam block 229.

If a track file is updated using a detected measurement, an estimate of target bearing or angle with respect to the sensor 10 will be determined. This angle estimation is tracked in order to filter the noisy angle estimation that is obtained. An angle estimate is achieved by comparing the squared magnitude of the FFT detections at the measured frequency of interest for the current beam/ramp combination with the neighboring beam's identical ramp and frequency bin. If a target is detectable by more than one beam, than an angle estimate can be achieved by examining the power ratio between the beams. The larger value in the two adjacent beam FFT's is assumed to be of the same target and is selected to be used for angle estimation. For example, if a target exists in beam B and beam C and beam B is currently being updated, the angle estimation will be performed using the FFT outputs from beam B and beam C.

Figure 11:
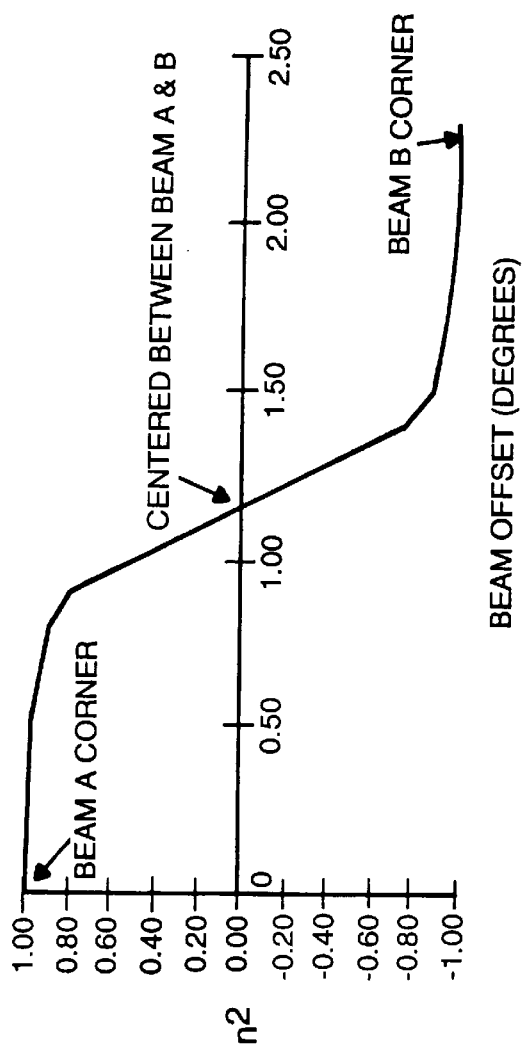
FIG. 11 is a plot showing the relation between target angle and $M^2$.
Figure 12:
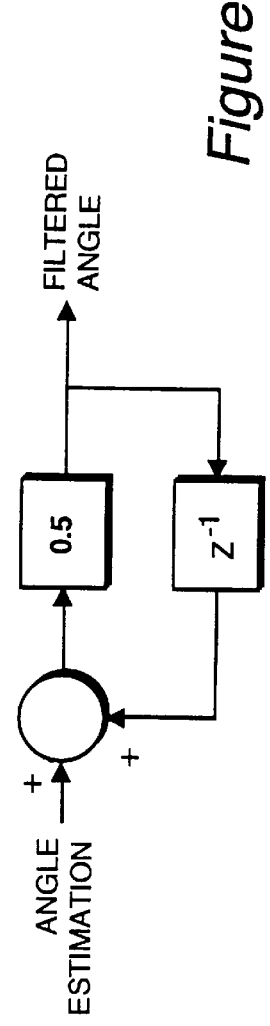
FIG. 12 is a block diagram of a G type filter.

The magnitude returns in the FFTs vary from target to target. These returns must be corrected for attenuation differences between beams and then normalized to remove the bias due to target size. By creating a ratio, $\Delta M^2$, where $$\Delta M^2 = \frac{(M_{tgt}^2 - M_{adj}^2)}{(M_{tgt}^2 + M_{adj}^2)}$$

and $M^2_{tgt}$ and $M^2_{adj}$ are the target and adjacent beam values respectively, a normalized representation of the target is obtained. Assuming $M_{tgt}$ and $M_{adj}$ are from the same scatterer on the target, this function can be used to determine a relative angle estimation of the target. Using a table that characterizes the beam angle versus the ratio $\Delta M^2$, an angle estimation of the scatterer and therefore the target can be obtained. Referring momentarily to FIG. 11, a typical angle vs. $\Delta M^2$ relationship is shown. If both neighboring FFT's attenuation corrected power values are approximately equal to the noise floor (i.e. no target detected in the neighboring beams), then through this process the angle estimation will be approximately equal to the middle of the current beam, as expected. Similarly, if the magnitude values from the beam of interest and the neighbor beam are equal, then the angle estimation will bisect the angle between the two beams. The large variances which are possible in the magnitude squared measurements creates a noisy estimated angle. By applying a G type filter, the estimation angle can be filtered to reduce the variance in the estimated angle. A G type filter is shown in FIG. 12.

Figure 13:
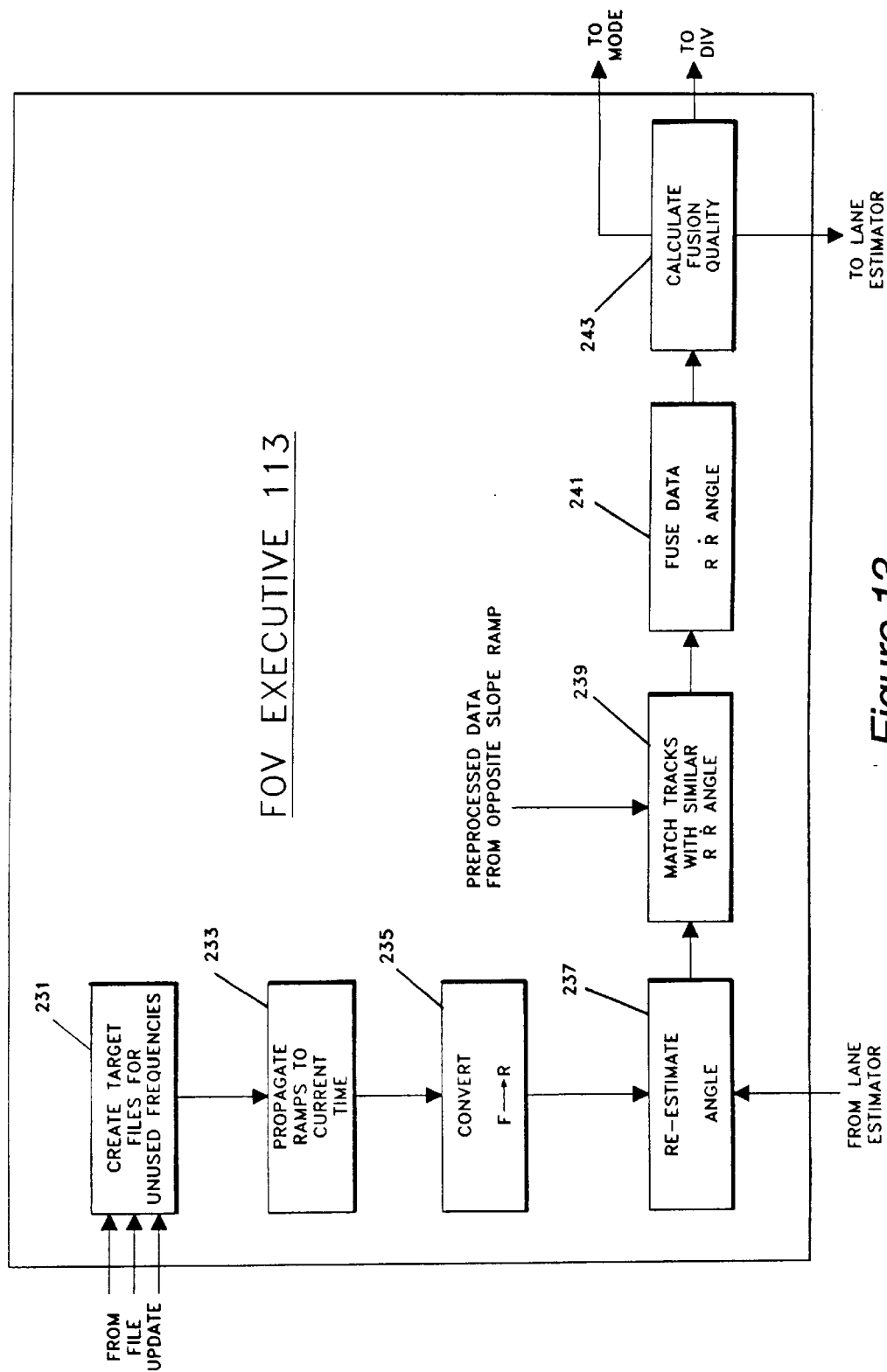
FIGS. 13 and 14 are more detailed flow diagrams of the signal processing.

After all search track files have been matched and updated, any unmatched frequency not attributed to stationary clutter is initialized as a possible target track as shown by the Create Target Files For Unused Frequencies block 213 in FIG. 13. All track files are initialized to:

Frequency ($f$) Frequency Measured

Frequency Rate ($\dot{f}$): 0.0

Frequency Accel. ($\ddot{f}$): 0.0.

Since no frequency rate information is available, it is expected that the error until the first update is large. Therefore, the error covariance is set such that an initialized frequency window covers to the entire frequency band. The target files are propagated forward to the current time as shown by Propagate Ramps To Current Time block 233.

Target tracking is done in frequency space. The desired information is in dimensional space. A conversion of the target track files to polar coordinates is required to properly analyze the targets currently being tracked as shown by Convert Frequency To Range block 235. The angle stored with a particular track is then altered by the input from the Lane Estimator (see below) in block 237. This transformation to polar coordinates allows the matching of the positive and negative ramp track files created by the same target as shown by Match Track block 239 after reestimation of the target angle with data from the Lane Estimator (block 237). The matched files can be combined to obtain improved target range and range rate estimates. The frequency/range/range rate relationship is:

$$f = c_1 x_{tgt} + c_2 \dot{x}_{tgt}.$$

Taking the first and second partial derivative of the frequency/range/range rate relationship, the following target state/range/range rate relationship is obtained:

$$f^{t+}(k) = c_1 x_{tgt}(k) + c_2 \dot{x}_{tgt}(k),$$

$$\dot{f}^{t+}(k) = c_1 \dot{x}_{tgt}(k) + c_2 \ddot{x}_{tgt}(k), \text{ and}$$

$$\ddot{f}^{t+}(k) = c_1 \ddot{x}_{tgt}(k) + c_2 x_{tgtjerk}(k).$$

Assuming the target jerk is negligible, it is possible to solve for range, rate and acceleration in terms of the frequency track states. Through substitution the following frequency space to range space transformation is obtained:

$$\begin{matrix} x_{tgt}(k) \\ \dot{x}_{tgt}(k) = \\ \ddot{x}_{tgt}(k) \end{matrix} \begin{matrix} 1/c_1 & -c_2/c_1 & c_2^2/c_1^3 \\ 0 & 1/c_1 & c_2/c_1^2 \\ 0 & 0 & 1/c_1 \end{matrix} \begin{matrix} f^{t+}(K) \\ \dot{f}^{t+}(k) \\ \ddot{f}^{t+}(k) \end{matrix}$$

Using the above range conversion matrix, all frequency track files are also represented in range space. The ranges and rates obtained from the individual track files, is only half of the data obtained from that target. The complementary ramp contains a similar track of the same target. Until now, it was difficult to combine these target track frequencies due to the range, range rate coupling in the frequency measurement. This difficulty is removed through this conversion of the target track files to vehicle range, range rate and acceleration. Similar range/range rate tracks in both ramps can now be associated as tracks of the same target. After association, a Fuse Data block 241 is performed wherein an improved track file can be obtained through fusion of the separate track files.

The target trackers track angle as well as frequency. This added discriminant assists in the matching of the two ramp tracks. The two tracks must match the following requirements in order to be fused: range <1.0 meters; range rate <2.0 meters/second; and angle <½ beam separation. Once matched, an improved estimate of range and range rate can be obtained. The individual tracker estimates of range rate and acceleration are derived quantities from the ramp tracking filters. These estimates are obtained through the frequency/range conversion from a combination of frequency rate and frequency acceleration.

As described hereinabove, the CFAR frequencies being tracked are a combination of vehicle range and range rate. By fusing the up and down ramp that have been matched, improved smoothed values of target range and range rate can be obtained according to the following equations:

$$x_{fused\ ring}(k) = \frac{(f^{t+}(k))_{up\ ramp} - (f^{t+}(k))_{down\ ramp}}{2c_1},$$

$$\dot{x}_{fused\ ring}(k) = \frac{(f^{t+}(k))_{up\ ramp} - (f^{t+}(k))_{down\ ramp}}{2c_1}.$$

These values of range and range rate are typically more precise since they are obtained from two measured quantities instead of one derived value. It is possible to obtain an improved derived estimate of target acceleration through a similar process. Target acceleration can be determined using the following equation:

$$\ddot{x}_{fused\ ring}(k) = \frac{(\dot{f}^{t+}(k))_{up\ ramp} - (\dot{f}^{t+}(k))_{down\ ramp}}{2c_2}.$$

Figure 14:
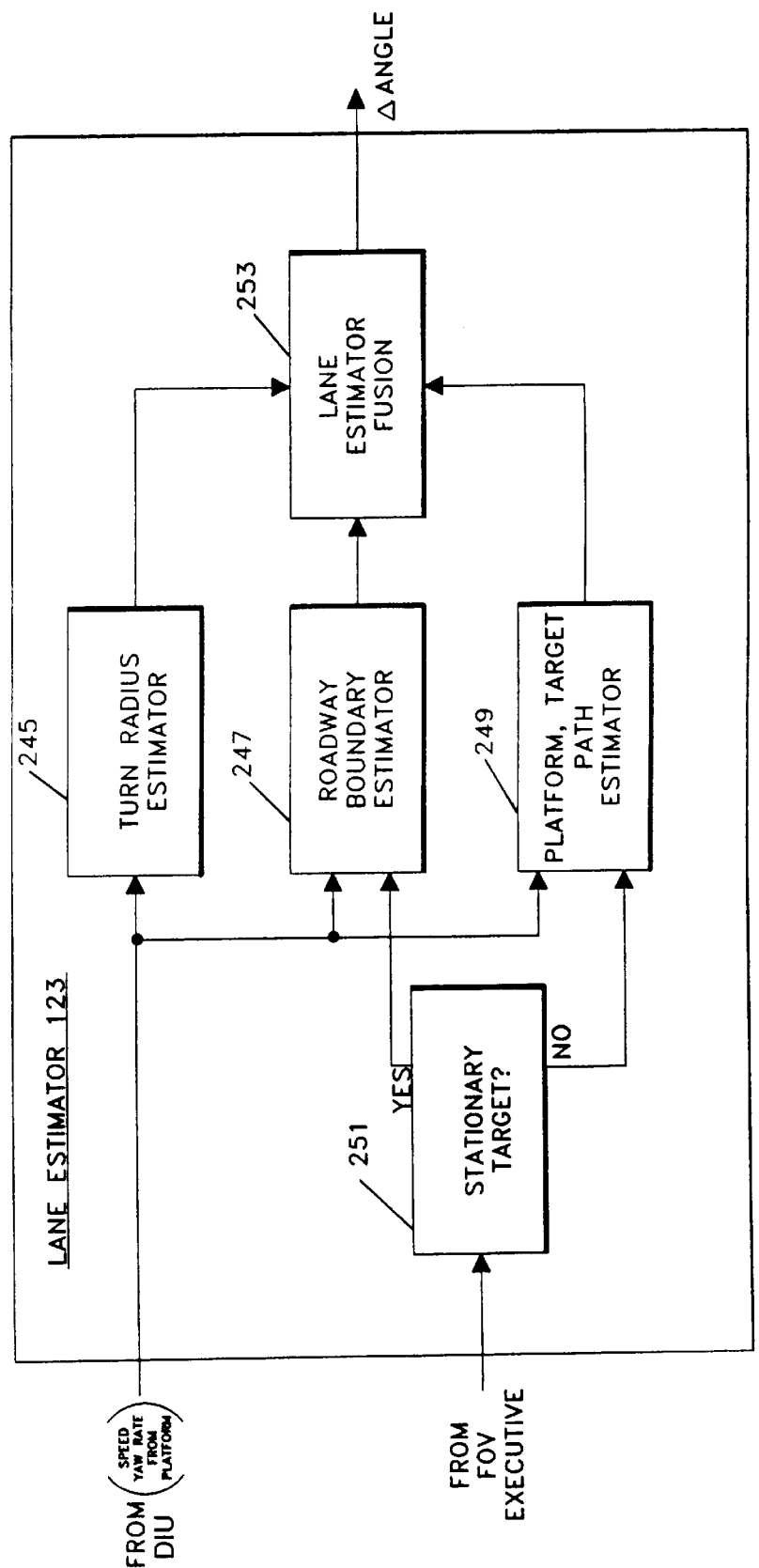
Figure 15:
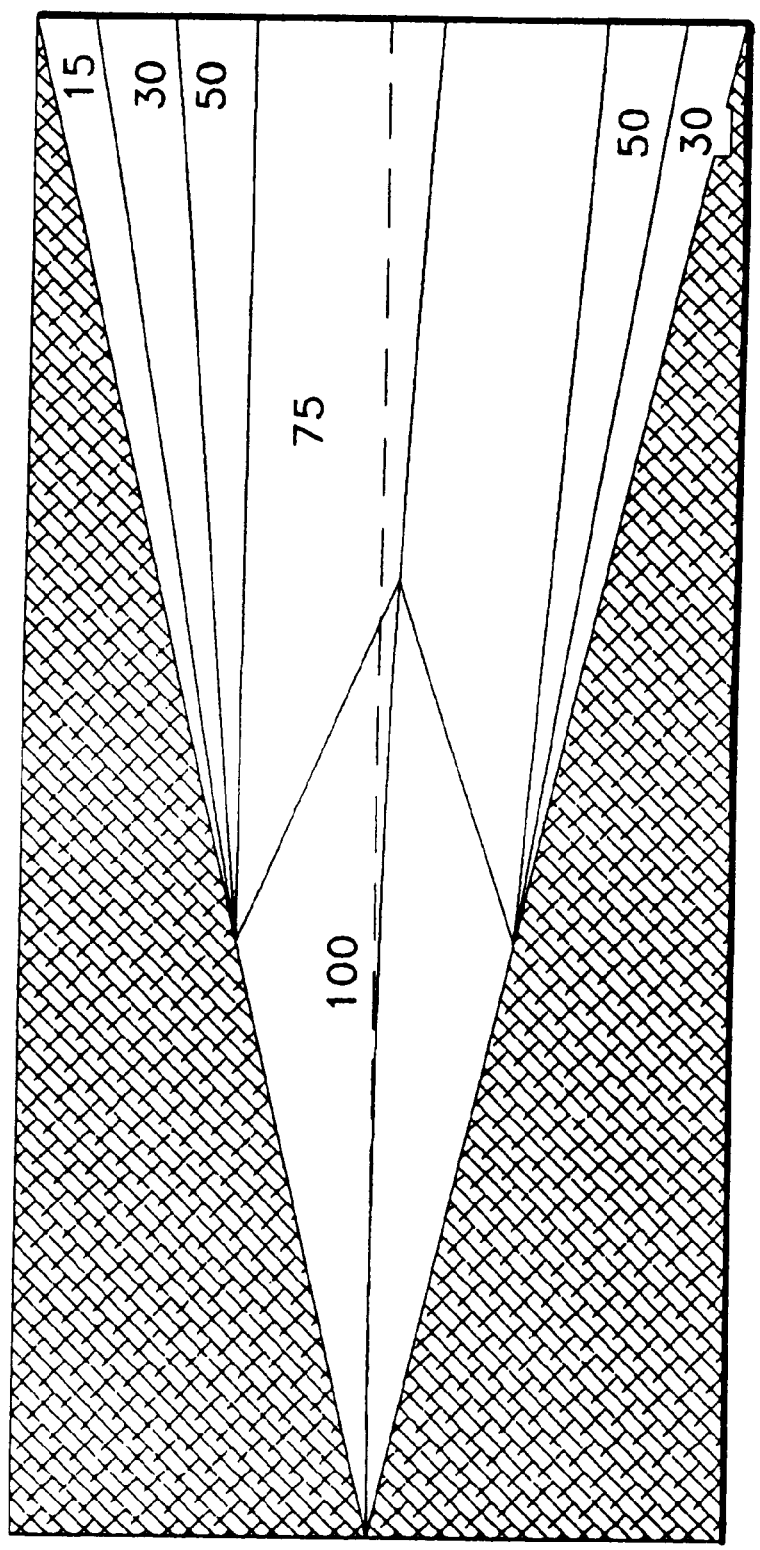
FIG. 15 is a sketch of a roadway prediction function.

A Calculate Fusion Quality block 243 is performed next wherein the quality of the fusion process is determined. Data outputs from this point go to the Lane Estimator (FIG. 14), the Mode block (FIG. 15) and the DIU for dissemination to the platform vehicle, if desired.

The Lane Estimator takes data from two sources, one being the platform vehicle, the other the FOV Executive, and attempts to predict where the road ahead is. From the platform, the sensor speed and yaw rate are supplied. This data is sent to the Turn Radius block 245, the Roadway Boundary Estimator block 247 and the Platform and Target Path Estimator block 249. The latter two also receive inputs from the sensor. A decision whether a given target is stationary or moving is made in block 251. If stationary, the data is fed to block 247 as information about the edge of the road. If moving, the data is fed to block 249 as information about where all the moving targets are going. Outputs from the three estimators are fed to the Lane Estimator Fusion block 253 to generate the path prediction. A typical prediction would generate a probability plot similar to the one shown in FIG. 15.

Figure 16:
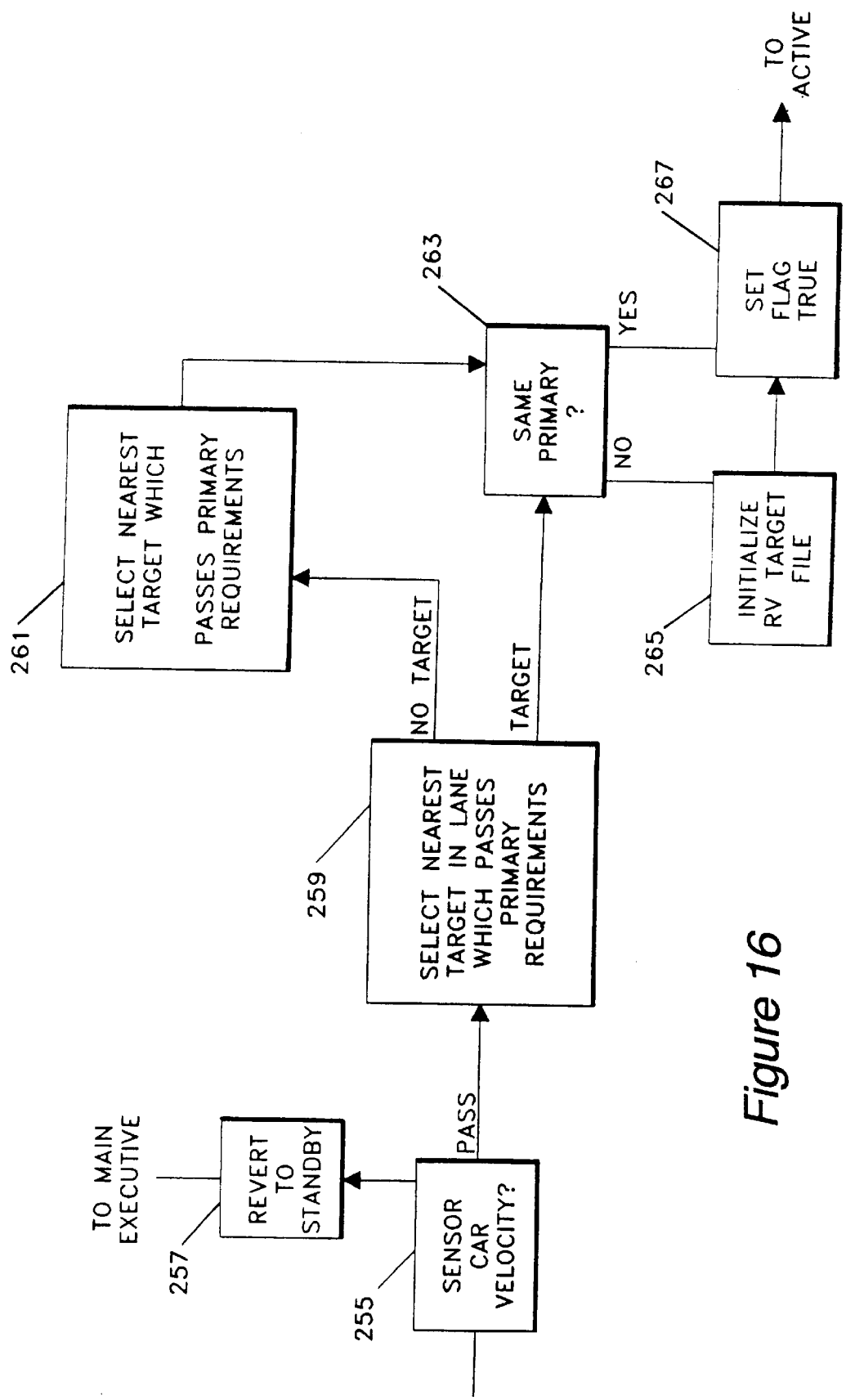
FIGS. 16 to 19 are the remaining detailed flow diagrams of the signal processing according to the invention.

Having a set of data of the targets in the field of view, the signal continues to FIG. 16, where a Sensor Car Velocity Test block 255 is performed wherein the sensor car velocity requirements are tested. If the velocity test fails, the system reverts to standby (block 257). If the velocity test passes, a Select Nearest Target in Lane Which Passes Primary Requirements block 259 is performed.

During acquisition mode, a primary target is selected for following. The objective during acquisition is to find the target directly in front of the sensor 10. The primary target is the nearest target in range that adheres to a set of requirements such as:

| Requirements | Limits |
| --- | --- |
| Sensor Velocity (True): | 120 mph > Sensor speed > 30 mph |
| Target Velocity (True): | 120 mph > Target speed > 30 mph |
| Target Range (Relative): | 5–100 meters |
| Target Deceleration: | <1.0 G |
| Target Acceleration: | <0.4 G |
| Target Location: | <1 lane width, <±1.88 meters from sensor boresight |
| Minimum Headway: | Target Range > $\mu$ x Target Velocity |

($\mu$ = Min. Headway Time (.5 sec Typ)

If the Lane Estimator indicated that there is a curve ahead, then the search is directed towards the expected location of the roadway. If a vehicle cannot be found that adheres to these requirements, a secondary search is made for targets adhering to the primary target requirements but is not within one lane width from the sensor boresight, i.e. the target location is modified to a target crossrange location greater than one lane width, but less than two lane widths as shown in block 261. If a target still cannot be found, then no primary target is available and the processing continues with the next dwell.

If a primary target is designated, Same Primary block 263 is performed wherein it is determined if the primary target is the same target that was previously designated as the primary target. If the targets are the same, then the flags are maintained as they were (block 267).

If this is a new primary target, the RV tracker is initialized and started. The RV tracker is initialized by setting all RV track file status' to their deactivated value as shown by block 265. Once the states are deactivated, the flags are set true on the primary target files in the FOV tracker as shown by block 267. If the primary target designation does not change during the current dwell, the RV tracker is not initialized and the ongoing primary target and the competing target information is updated in the RV tracker.

Once in follow mode, the tracking system designates the target as primary until it is no longer detectable by the sensor 10 or violates any of a set of requirements such as:

| Requirements | Limits |
| --- | --- |
| Sensor Velocity (True): | 120 mph > Sensor speed > 30 mph |
| Target Velocity (True): | 120 mph > Target speed > 0 mph |
| Target Range (Relative): | Leaves field of view |
| Target Velocity (Relative): | <±30 mph |
| Target Deceleration: | <1.0 G |
| Target Acceleration: | <0.4 G |
| Sensor/Primary Target Line of sight: | Unobstructed |

Once the primary target is ruled invalid, the sensor 10 communicates the target invalid status to the controller which makes the transition from the follow mode to the acquisition mode.

Figure 17:
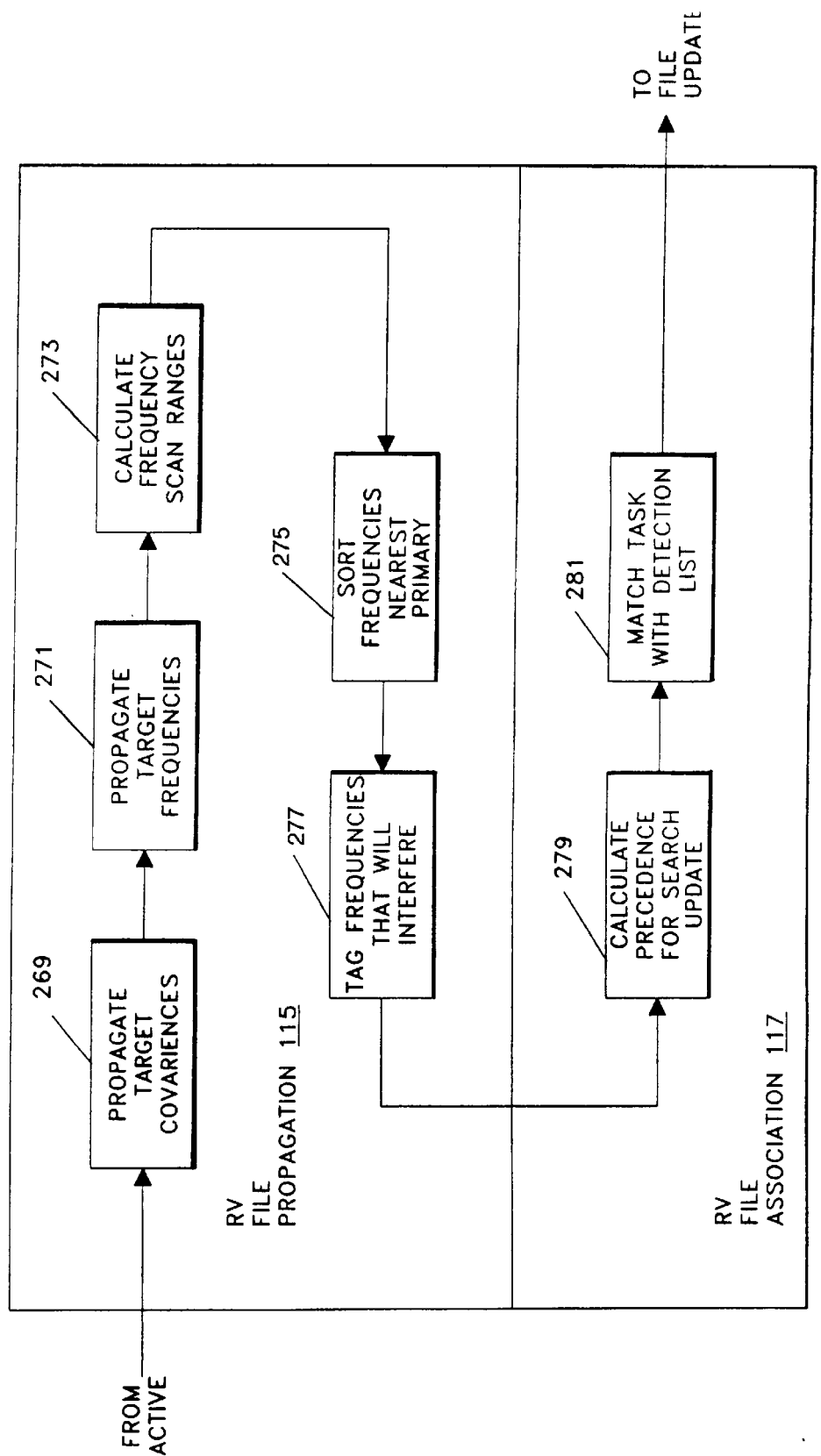

The RV tracker operates in a manner similar to the FOV tracker as described hereinabove but with a reduced detection list. Referring to FIG. 17, a Propagate Target Covariances block 269 is executed in the same manner as block 193. Next, a Propagate Target Frequency block 271 is executed in the same manner as block 155. Next, a Calculate Frequency Scan Range block 273 is executed to define the frequency search window which is the region the target frequency under track will most likely be found. Next, a Sort Frequencies Nearest to Primary block 275 is performed to list the order in which target frequencies are in proximity of the primary frequency. A Tag Frequency That Will Interfere block 277 is then performed. During Reduced View (RV) file association, the primary object is to maintain the best possible track on the primary target as possible. Therefore, the primary target takes precedence in all association operations and different processing is performed for RV file association than that used with FOV file association. Like the FOV update precedence, only one target frequency can be associated with a frequency detected in the FFT. Since the primary target is the primary responsibility of the RV tracker, the primary target takes precedence in RV detection association. As shown in block 279, to assure that targets closely spaced to the primary target do not interfere with the primary target, the remaining RV track files (untagged from block 277) are updated with respect to their distance in frequency from the primary target's frequencies. Therefore, the closest target in frequency to the primary target will be associated after an attempt to associate the primary target frequency has been made.

Using the previously described precedence, the RV target files are matched as shown by block 281 with the frequencies measured in the FFT. If the difference between the predicted frequency and a measured frequency is within the frequency search window as defined herein above, the search target file and measured frequency are considered matched and tagged accordingly. This tagged measurement can no longer be associated with another RV target file. If a measured frequency cannot be found within the search window, the RV target file is considered unmatched and tagged accordingly and the next RV target file in the order of precedence list is considered. If more than one frequency is included within the frequency search window, the closest frequency to the predicted frequency is selected.

If the primary target fails to associate with a measured frequency, a larger search window is defined. Also, if the association of the primary target fails, processing is performed to find another measurement of the primary target in order to continue updating the primary tracker. After all target files have been attempted to be associated, the target files are updated according to their detection match status.

Again, in order for a target to initiate a track, it must be seen twice in the same beam in two major dwells. This prevents creating unwanted track files on noise that has crossed the threshold. In addition, since targets typically are frequently seen in some ramp/beam combination from dwell to dwell, then any target not matched for some given time is deleted. When targets are interfering with the primary target track in the RV tracker, a different track file update process for the primary and interfering targets is used as to be described. In those cases when the primary is not being interfered, the update process for the RV tracker is similar to the FOV tracker.

Figure 18:
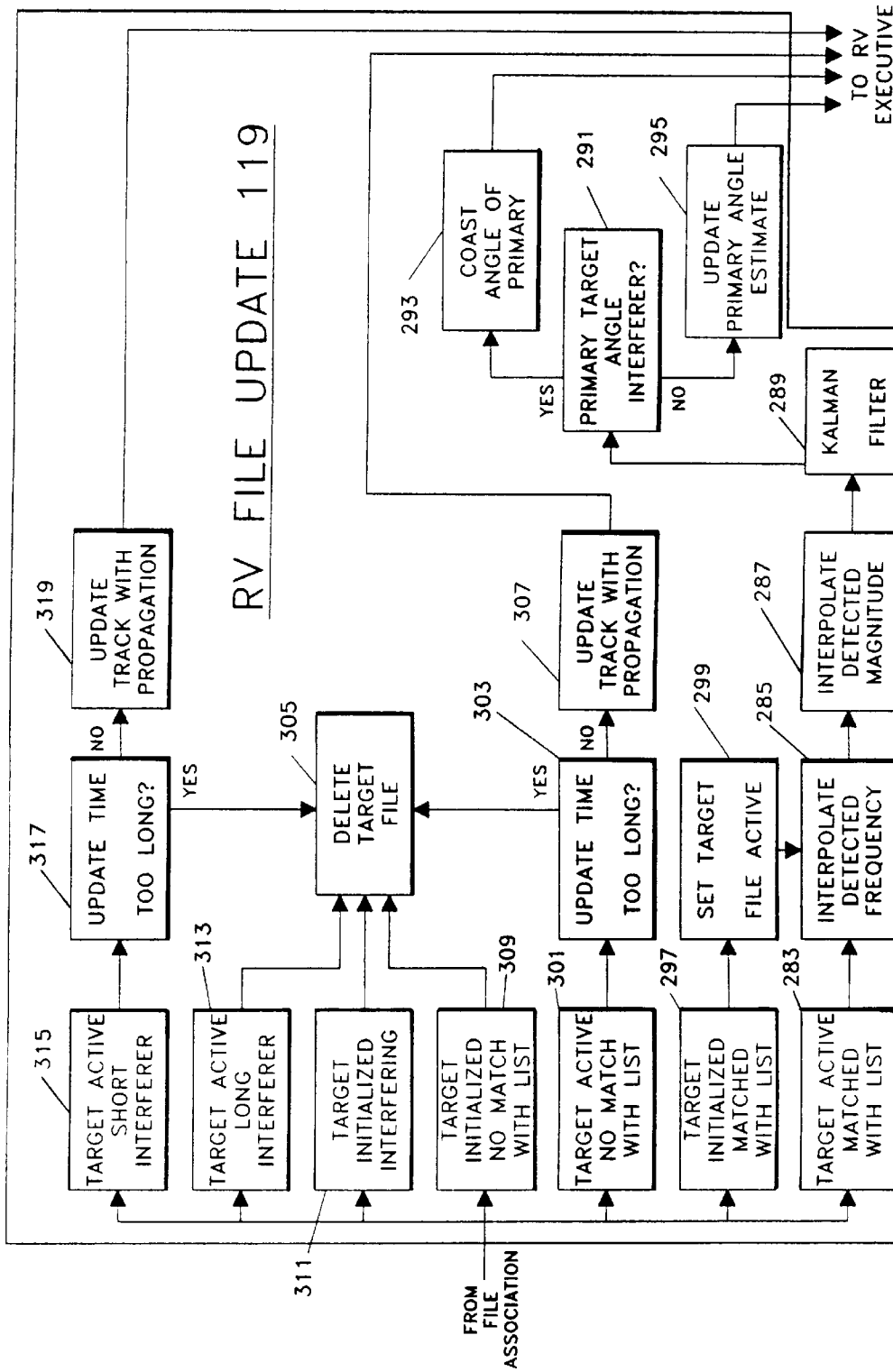

Referring now to FIG. 18, a Target File Active Matched With List block 283 is performed wherein target files which are active and are matched with a measured frequency are identified. Next, an Interpolate Detected Frequency block 285 is performed and then an Interpolate Detected Magnitude block 287 is performed in a manner similar to the FOV tracker. Next, a Kalman Update block 289 is performed wherein a least squares estimate of the current state based on previous estimates is provided as described hereinabove. Next, a Primary Target Angle Interferer block 291 is performed wherein target files in neighboring beams that are at the same frequency as the primary target but does not represent the target are identified. If yes, then a Coast Angle of Primary block 293 is performed wherein the angle estimation process described in the FOV tracker is not performed. If no, then an Update Primary Angle Estimate block 295 is performed wherein the FOV angle estimation process is performed.

A Target Initialized Matched With List block 297 is performed wherein targets which have been initialized and are matched with a measured frequency are identified. Next, a Set Target File Active block 299 is performed wherein target files for the targets identified by block 299 are set active. Next, the Interpolate Detected Frequency block 285 is performed and the processing continues as described hereinabove.

A Target File Active No Match With List block 301 is performed wherein all active target files that did not match with a measured frequency are identified. Next, an Update Time Too Long block 303 is performed wherein the Target Files Identified by block 301 are checked for when there last was a match. If two seconds have lapsed, a Delete Target File block 305 is performed to delete the target file in question. If two seconds have not lapsed, an Update Target File With Propagation block 307 is performed wherein the target file is updated with a value resulting from taking the target's previous frequency value propagated forward in time to anticipate what the previous value should currently be and using that value as the updated value for the target file.

A Target Initialized No Match With List block 309 is performed wherein targets that have been initialized but did not match a current measured frequency are identified. The Delete Target File block 305 is then performed wherein the target files identified by block 309 are deleted.

In the RV tracker, targets may be identified as interfering with the primary target, or alternatively, having the potential of interfering with the primary target. The targets that are identified as potential of interfering with the primary target could be a short interferer or a long interferer, where short and long indicate the duration of interference. As described hereinafter, some targets may be labeled as such. A Target Initialized Interfering block 311 is performed wherein targets that have been initialized and interfering are identified. The Delete Target File block 305 is then performed wherein the target files identified by block 311 are deleted. A Target Active Long Interferer block 313 is performed wherein active targets that are long interferers are identified. The Delete Target File block 305 is then performed wherein the target files identified by block 313 are deleted. A Target Active Short Interferer block 315 is performed wherein active targets that are short interferers are identified. Next, an Update Time Too Long block 317 is performed wherein the target files identified by block 315 are checked for when there last was a match. If two seconds have lapsed, then the Delete Target File block 305 is performed to delete the target file in question. If two seconds have not lapsed, then an Update Target File With Propagation block 319 is performed wherein the target file is updated with a value resulting from taking the target's previous frequency value propagated forward in time to anticipate what the previous value should currently be and using that value as the updated value for the target file.

Figure 19:
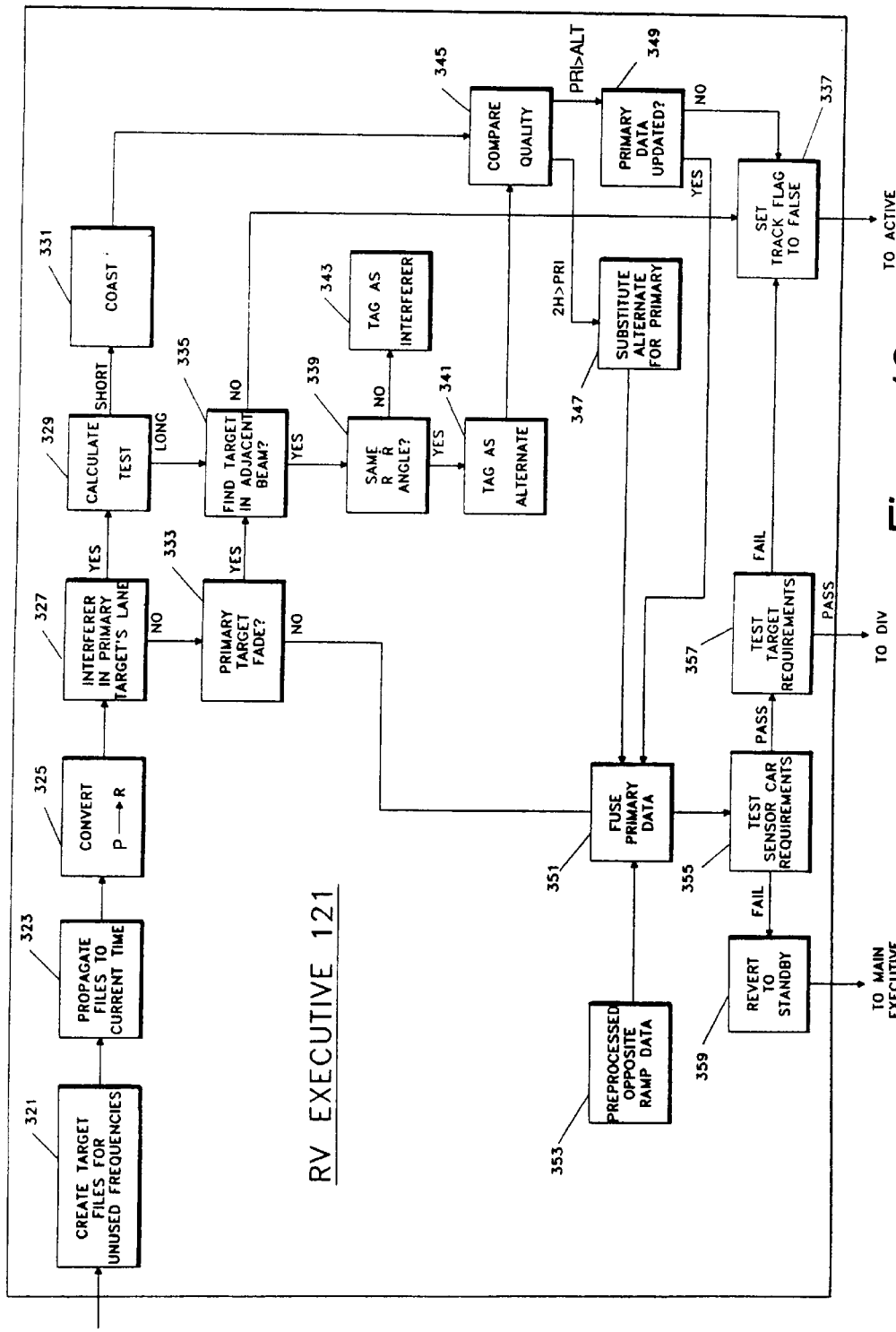

In FIG. 19, after all track files have been matched and updated, any unmatched frequency not attributed to stationary clutter is initialized as a possible target track as shown by the Create Target Files For Unused Frequencies block 321. All track files are initialized to:

Frequency $(f)$: Frequency Measured

Frequency Rate $(\dot{f})$: 0.0

Frequency Accel. $(\ddot{f})$: 0.0

Since no frequency rate information is available, it is expected that the error until the first update is large. Therefore, the error covariance is set such that an initialized frequency window covers the entire frequency band. Unlike the FOV tracker update precedence, unmatched frequencies are added with respect to the frequency difference between the unmatched frequency and the frequency for the primary target. This results in the nearest target to the primary target being added to the RV track list first. The target files are propagated forward to the current time as shown by Propagate Ramps to Current Time block 323.

Target tracking is done in frequency space. The desired information is in range space. A conversion of the target track files to polar space is required to properly analyze the targets currently being tracked as shown by Convert Frequency to Range block 325.

If there are no other target frequencies under track in the RV tracker that will occupy the primary target's frequency bin, then the primary target update process is the same as the process used for other targets included in the RV tracker. If another RV target frequency under track is going to interfere with the primary target's frequency, additional processing is performed in the update process to increase the likelihood of maintaining track on the primary target. It will now be helpful to discuss the various interference problems and the solution thereof.

Targets tracked in the RV tracker will tend to move in frequency. It is possible that other track frequencies will occupy the same bin within a common beam as the predicted bin for the primary target as shown by the following equations:

$$(f^{t+}(k))_{primary} + (\dot{f}^{t+}(k))_{primary} \Delta t =$$
$$(f^{t+}(k))_{non-primary} + (\dot{f}^{t+}(k))_{non-primary} \Delta t,$$
$$(f^{t+}(k))_{primary} \neq (f^{t+}(k))_{non-primary},$$
$$(\dot{f}^{t+}(k))_{primary} \neq (\dot{f}^{t+}(k))_{non-primary}.$$

When the latter occurs, the measurement may be a combination of the two targets or only a measurement returning from the non-primary target which makes it difficult to determine the difference between the two targets. It is assumed that the primary target is not visible and therefore this measurement should not be used for updating the primary target. Unfortunately depending on the time in which the primary target will be interfered, this measurement may need to be used.

If both the primary target and interfering target are currently under track, an estimate of the interference time, $t_{cst}$, can be made. If primary interference occurs when the primary target and interfering target are within approximately 2.2 bins of each other, the interference time can be written as:

$$t_{cst} = \frac{3500\alpha - (f^{t+}(k))_{primary} + (f^{t+}(k))_{non-primary}}{(\dot{f}^{t+}(k))_{primary} - (\dot{f}^{t+}(k))_{non-primary}},$$

where $\alpha = \text{sign}\,((f^{t+}(k))_{primary} - (f^{t+}(k))_{non-primary})$.

The value 3500 is based upon the ramp slopes and durations.

If $t_{cst}$ is less than two seconds, the interferer is termed a short interferer. Beyond two seconds, the target is identified as a long interferer with the primary target. Depending on the interference type, the primary target may or may not be updated.

Short interferers are within the interference region for less than two seconds. In most cases short interferers will be stationary clutter or oncoming cars and will be within the interference region for only one to two major dwells. The RV tracker is able to maintain a track on the primary target even if an update is unavailable for up to two seconds. Therefore, when the competing target is a short interferer, the primary target is not allowed to associate with the measurement that is being interfered. In addition, the competing target will not be associated in this event. Both targets will be defined as coasting during this period and the interferer is updated according to the no detection association update process. If the primary target is detectable in another beam it is updated as described hereinafter. If no other beam detects the primary target, the primary target is also coasted and is updated according to the no detection association update process.

The RV tracker is unable to maintain a reliable track on the primary target when updates are unavailable for more than two seconds. If this primary target measurement is the only measurement available for the primary target, the primary target will be tracked regardless of the competing interferer. This is defined as a blob track. During a blob track the two targets are essentially tracked as one. When the two targets contained in the blob track separate, a best estimate is made upon which of the targets is the primary target. The interfering target is deleted.

The primary target, i.e. a moving car, has appreciable width and might be detectable in more than one beam. The adjacent beam could be tracking a target that is also the primary target vehicle but is not designated as such. By comparing this track with the primary target track it is possible to define an alternate primary track. An adjacent beam frequency track that matches the primary track to the following requirements is defined as an alternate primary track: i.e. frequency difference is less than 1000 Hz, frequency rate difference is less than 3600 Hz per second and the angle is less than one-half of a beam separation. When the primary target frequency track cannot be updated due to a fade of the target signature or when a competing target is interfering, the frequency measurements used to update the alternate primary target can be used to update the primary with some increase in uncertainty. This increase in uncertainty is less than the uncertainty increase due to no frequency update for both long term and short term interferers.

There are two reasons in which the primary target designation should be moved to an adjacent beam. The most common reason is attributed to movement of the target. As the target moves along a curved path, the primary target will move from beam to beam. When the primary target can no longer be reliably detected in the current primary beam, and alternate primary tracks have been defined then the primary designation is allowed to transfer to the alternate primary tracks. Competing or interfering targets is another reason for alternate beam tracking. If the primary is currently being interfered with in the current beam, and there exist alternate primary tracks for both the up and the down ramp which are not being interfered with, it is more advantageous to transfer the primary designation to the alternate primary tracks. This transfer of the primary designation can be described as selecting the tracks associated with the primary that have the highest quality and lowest probability of being interfered with. Signal to interference levels for the primary and alternate primary targets are used as an additional discriminant for primary target beam selection.

The target angle estimation process discussed hereinabove does not address the case in which another target is located in the adjacent beam at the same frequency bin and ramp as the target upon which the angle estimation is being performed. This secondary target will influence the angle estimation. For non-primary targets, this biased angle estimation will not result in degraded performance of the tracker objectives but, with the angle tests placed on the primary target, additional angle estimation processing needs to be defined for the primary. If another target which is not associated with the primary is included in the appropriate bin in the primary beam or beams next to the primary, no primary angle estimation will be made for the primary target in that ramp. If the primary target's opposing ramp angle estimation is not suppressed, its value will be used to update the current tracks angle estimation. This prevents the two ramps from diverging due to non-symmetric angle estimation updates. If both the up and down ramp for the primary target are interfered with, the angle tracking filter is coasted.

Having described the various interference problems and solutions thereof, we will continue with describing the processing steps. A Interferer in Primary's Beam block 327 is performed wherein it determined if there is an interfering target in the primary beam. If yes, the interference time is calculated, block 329. If the time is short, the track will be allowed to coast, block 331. If the time is long, or the primary target fades (block 333), the Find Target in Adjacent Beam block 335 is performed. If there is none, the flag is set to false (block 337). If there is, the Test for Same Range, Rate and Angle, block 339 is performed. If yes, the interferer is tagged as an alternate primary target (block 341), if no, as an interferer (block 343).

An alternate primary must satisfy the following conditions:

A Range < 1 meter;

Rate < 3 meters/s;

Δ angle < 1/2 beam width or 1.5 meters.

Next, a Compare Alternate Primary and Primary Track Quality block 345 is performed for comparing the quality of the primary target with the alternate primary target. If the primary target value is less than the alternate primary target value, then a Substitute Alternate for Primary block 347 is performed wherein the alternate primary target is made the primary target and processing is continued. If the primary target value is greater than the alternate primary target value, then a Primary Data Updated Query block 349 is performed wherein a test if the primary still exists is performed. If no, then a Set Track Flag to False block 337 is performed wherein the system has lost the target and the radar is put into the acquisition mode. If yes, then a Fuse Primary Data block 351 is performed using the data processed from the ramp with the opposite slope (block 253) wherein the two ramps (up and down) are fuzed to obtain the range/range rate estimates. If the quality of the alternate target is greater, then the alternate data is fused. The target data tracked by the RV tracker including the primary target data are stored in digital memory.

A Test Sensor Car Requirements block 355 is performed wherein the sensor's parameters are compared to the limits set upon it, such as minimum velocity. If the latter fails, a Revert to Standby block 359 is performed wherein the radar goes out of the active state until the requirements are once again met. If the test performed by block 355 passed, then a Test Target Requirements block 357 is performed wherein the target is compared to its requirements, as listed above. If the latter fails, the Set Track Flag to False block 337 is performed and the processing continues with the next dwell. If the test performed by block 357 passed, then the track flag remains true and the processing continues with the next dwell. The processing continues for each dwell continuously providing a range, a range rate and an acceleration value for the primary target while in follow mode.

Having described this invention, it will now be apparent to one of skill in the art that various modifications could be made thereto without affecting this invention. It is felt, therefore, that this invention should not be restricted to its disclosed embodiment, but rather should be limited only by the spirit and scope of the appended claims.

What is claimed is:

1. A method of operating a radar receiver comprising the steps of:
    (a) sampling received signals at a predetermined sampling rate to periodically provide a set of selected samples, the set of selected samples including positive going ramp samples, negative going ramp samples and CW burst samples;
    (b) performing a first fast Fourier transform on the positive going ramp samples, performing a second fast Fourier transform on the negative going ramp samples and performing a third fast Fourier transform on the CW burst samples;
    (c) tracking one or more signals provided from the first fast Fourier transform performing step, wherein each of the one or more signals provided from the first fast Fourier transform performing step represents a corresponding target and said tracking step provides range, range rate, and acceleration of each corresponding target;
    (d) tracking one or more signals provided from the second fast Fourier transform performing step wherein each of the one or more signals provided from the second fast Fourier transform performing step represents a corresponding target and said tracking step provides range, range rate, and acceleration of each corresponding target;
    (e) tracking one or more signals provided from the third fast Fourier transform performing step wherein each of the one or more signals provided from the third fast Fourier transform performing step represents a corresponding target and said tracking step provides range, range rate, and acceleration of each corresponding target; and
    (f) associating the signals from the tracking steps in a track combiner to periodically provide output signals corresponding to track states of each of the corresponding targets.

2. The method as recited in claim 1 further comprising the steps of:
    (g) providing the radar receiver with an antenna having multiple antenna beams; and
    (h) repeating steps (a)–(f) for received signals from each of the multiple antenna beams.

3. A radar receiver comprising:
    (a) means for sampling received signals at a predetermined sampling rate for periodically providing a set of selected samples, the set of selected samples comprising positive going ramp samples, negative going ramp samples and CW burst samples;
    (b) fast Fourier transform means for performing a first fast Fourier transform on the positive going ramp samples, for performing a second fast Fourier transform on the negative going ramp samples and for performing a third fast Fourier transform on the CW burst samples;
    (c) means for tracking one or more signals provided by the fast Fourier transform means wherein each of the one or more signals provided from the fast Fourier transform means represents a corresponding target and said means for tracking provides range, range rate, and acceleration of each corresponding target; and
    (d) means for associating the signals provided from the means for tracking to periodically provide output signals corresponding to track states of the corresponding targets.

4. The radar receiver as recited in claim 3 further comprising an antenna system having a plurality of beams and wherein the set of selected samples comprises positive going ramp samples, negative going ramp samples and CW burst samples associated with each of the plurality of beams.

5. A frequency modulated continuous wave radar system comprising:
    (a) means for periodically transmitting a signal having a positive going frequency ramp portion, a negative going frequency ramp portion and a continuous wave burst portion;
    (b) means for receiving one or more signals returned from one or more targets;
    (c) means for sampling the received signal at a predetermined sampling rate and for periodically providing a set of selected samples, the set of selected samples comprising positive going ramp samples, negative going ramp samples and CW burst samples;
    (e) a fast Fourier transform processor for performing a first fast Fourier transform on the positive going ramp samples, a second fast Fourier transform on the negative going ramp samples and a third fast Fourier transform on the CW burst samples:

(d) a target tracker for tracking each resulting signal provided by the fast Fourier transform processor; and (e) a track combiner to associate any resulting signals provided by the target tracker to periodically provide output signals corresponding to track states of each of the corresponding targets.

6. A radar system comprising:

means for decoupling range and range rate information from multiple objects along a roadway;

means for assigning a priority to each of the multiple objects;

means for identifying and verifying the presence of a moving object among the multiple objects and for changing the priority of the multiple objects based upon the presence of the moving object; and means for tracking the multiple objects.

7. The radar system recited in claim 6 comprising:

means for resolving target information to predict when objects will become closer than 5.5 meters.

8. The radar system recited in claim 6 comprising:

means for accurately resolving object information to predict object locations.

9. The radar system recited in claim 6 comprising:

means for sorting object information to distinguish a primary object from all other objects along the roadway.

10. A method of target tracking comprising the steps of:

(a) tracking, in a frequency space, at least one target in a field of view;

(b) determining frequency, frequency rate and frequency acceleration values for each of the at least one target in the frequency space;

(c) processing the frequency, frequency rate and frequency acceleration values for each of the at least one targets to decouple the range and range rate information in frequency space;

(d) transforming the frequency, frequency rate and frequency acceleration values in the frequency space to equivalent range and range rate values in a time space for each of the at least one targets in the field of view; and (e) comparing the range and range rate values of each of the at least one targets to primary target range and range rate threshold requirement values.

11. The method of claim 10 further comprising the step of selecting one of the at least one targets as a primary target based upon the results of the comparison step.

12. The method of claim 11 further comprising the steps of:

tracking the primary target in a reduced view tracker; and tracking any other targets within a predetermined range and angle of the pi target in the reduced view tracker.

13. The method as recited in claim 1 wherein the associating step comprises the steps of:

determining a first frequency, frequency rate and frequency acceleration of a target during a first instance of time;

predicting frequency, frequency rate and frequency acceleration of said target during a second instance of time;

determining a second frequency, frequency rate and frequency acceleration of a target during a second instance of time; and matching the estimated frequency, frequency rate and frequency acceleration of said target during a second instance of time with the second frequency, frequency rate and frequency acceleration of a target during a second instance of time to provide a track state.

14. The method as recited in claim 13 wherein the matching step comprises the steps of:

defining a frequency search window of a region a target frequency under track will most likely be found;

defining an order in which target frequencies under track will attempt to match with determined frequencies;

matching the predicted frequency with a determined frequency when the predicted frequency and the determined frequency are within the frequency search window.

15. The method as recited in claim 14 wherein the defining an order step comprises the steps of:

providing a track state file for each one of the track states of each of the corresponding targets; and dating each track state at a time of creation and starting with the oldest track file.

16. The method as recited in claim 1 comprising the steps of:

designating one of the output signals corresponding to track states of each of the corresponding targets as a primary target; and associating the remaining signals from the tracking step in order with respect to the remaining signals distance in frequency from the frequency of the primary target.

17. The method as recited in claim 16 wherein the associating step comprises the steps of:

defining a frequency search window of a region a target frequency under track will most likely be found; and matching a predicted frequency with a determined frequency when the predicted frequency and the determined frequency are within the frequency search window.

18. The method as recited in claim 17 comprising the step of:

increasing the size of the frequency search window when a predicted frequency and a determined frequency are not found within the frequency search window.

19. The method as recited in claim 2 comprising the steps of:

providing angle information of a target when the target is detectable by more than one beam.

20. The method as recited in claim 2 comprising the steps of:

updating a track state of a corresponding target in one beam from a track state of a corresponding target in another beam.

* * * * *

UNITED STATES PATENT AND TRADEMARK OFFICE
CERTIFICATE OF CORRECTION

PATENT NO. : 6,011,507
APPLICATION NO. : 08/745530
DATED : January 4, 2000
INVENTOR(S) : Curran et al.

It is certified that error appears in the above-identified patent and that said Letters Patent is hereby corrected as shown below:

Col. 5, line 66, delete "acceleration $f$, is used" and replace with --acceleration $\ddot{f}$, is used--.

Col. 5, line 67, delete "between $f$, $\dot{f}$ and $f$" and replace with -- $f$, $\dot{f}$ and $\ddot{f}$ and--.

Col. 6, line 17, delete "values of $f$ are" and replace with --values of $\ddot{f}$ are--.

Col. 6, line 39, delete "acceleration, $f_{tn}$" and replace with --acceleration, $\ddot{f}_{tn}$--.

Col. 6, line 65, delete "acceleration, $f_{t1}$ are" and replace with --acceleration, $\ddot{f}_{t1}$ are--.

Col. 7, line 3, delete "acceleration, $f_{t2}$, are" and replace with --acceleration, $\ddot{f}_{t2}$, are--.

Col. 10, line 63, delete "the AID will" and replace with --the A/D will--.

Col. 10, line 67, delete "into the AID" and replace with --into the A/D--.

Col. 14, line 32, delete "and $f(k-1)$" and replace with --and $\ddot{f}(k-1)$--.

Col. 14, line 66, delete " $= \pm 3\sqrt{P^{1-}(k)_{11}}$ " and replace with -- $= 3\sqrt{P^{t-}(k)_{11}}$ --.

Col. 19, line 41, delete "Frequency Accel. $(f)$: 0.0"

and replace with --Frequency Accel. $(\ddot{f})$: 0.0--.

Col. 20, line 52, delete " $\dot{x}$ fused ring $(k) = \dfrac{\left(f^{t+}(k)\right)\text{up ramp} - \left(f^{t+}(k)\right)\text{down ramp}}{2_{c1}}$ "

and replace with -- $\dot{x}$ fused ring $(k) = \dfrac{\left(f^{t+}(k)\right)\text{up ramp} + \left(f^{t+}(k)\right)\text{down ramp}}{2_{c1}}$ --.

Col. 20, line 63, delete " $\ddot{x}$ fused ring $(k) = \dfrac{\left(\dot{f}^{t+}(k)\right)\text{up ramp} - \left(\dot{f}^{t+}(k)\right)\text{down ramp}}{2_{c2}}$ "

and replace with -- $\ddot{x}$ fused ring $(k) = \dfrac{\left(\dot{f}^{t+}(k)\right)\text{up ramp} + \left(\dot{f}^{t+}(k)\right)\text{down ramp}}{2_{c2}}$ --.

Col. 24, line 33 delete "Frequency Accel. $(f)$ :0.0"

and replace with --Frequency Accel. $(\ddot{f})$ :0.0 --.

UNITED STATES PATENT AND TRADEMARK OFFICE
CERTIFICATE OF CORRECTION

PATENT NO. : 6,011,507
APPLICATION NO. : 08/745530
DATED : January 4, 2000
INVENTOR(S) : Curran et al.

It is certified that error appears in the above-identified patent and that said Letters Patent is hereby corrected as shown below:

Col. 29, line 58, delete "and angle of the pi target" and replace with --and angle of the primary target--.

Signed and Sealed this

Twenty-first Day of August, 2007

JON W. DUDAS
*Director of the United States Patent and Trademark Office*